(12) United States Patent
Kulkarni et al.

(10) Patent No.: US 10,158,742 B2
(45) Date of Patent: Dec. 18, 2018

(54) MULTI-STAGE ACCELERATION SYSTEM AND METHOD

(71) Applicant: ACTMOBILE NETWORKS, INC., Pleasanton, CA (US)

(72) Inventors: Pankaj G. Kulkarni, Koramangala Bangalore (IN); Phaniraj M. Raghavendra, Bangalore (IN); Rakesh Padinjeredil, Mysore (IN); Andrew Foss, San Jose, CA (US); John Coronella, Winchester, MA (US)

(73) Assignee: ActMobile Networks, Inc., Pleasanton, CA (US)

( * ) Notice: Subject to any disclaimer, the term of this patent is extended or adjusted under 35 U.S.C. 154(b) by 78 days.

(21) Appl. No.: 15/047,587

(22) Filed: Feb. 18, 2016

(65) Prior Publication Data
US 2016/0241528 A1    Aug. 18, 2016

Related U.S. Application Data

(60) Provisional application No. 62/117,879, filed on Feb. 18, 2015.

(51) Int. Cl.
*H04L 29/06* (2006.01)
*G06F 21/60* (2013.01)
*H04W 4/18* (2009.01)
*H04L 29/08* (2006.01)

(52) U.S. Cl.
CPC .......... *H04L 67/42* (2013.01); *G06F 21/606* (2013.01); *H04L 63/062* (2013.01); *H04L 67/2842* (2013.01); *H04W 4/18* (2013.01); *H04L 67/02* (2013.01)

(58) Field of Classification Search
CPC ..... G06F 21/606; H04L 63/062; H04L 63/08; H04L 67/2842; H04L 67/02; H04L 67/42; H04W 4/18
USPC .............................. 713/168, 189; 726/22–24
See application file for complete search history.

(56) References Cited

U.S. PATENT DOCUMENTS

| | | | | |
|---|---|---|---|---|
| 5,889,860 | A * | 3/1999 | Eller | G06F 21/10 705/51 |
| 7,809,820 | B2 * | 10/2010 | Stepin | H04L 63/0428 380/257 |
| 8,103,783 | B2 * | 1/2012 | Plamondon | H04L 67/2847 709/203 |
| 8,681,813 | B2 * | 3/2014 | Jain | H04L 47/38 370/466 |
| 9,509,663 | B2 * | 11/2016 | Bollay | H04L 63/166 |
| 2009/0132619 | A1 | 5/2009 | Arakawa et al. | |
| 2011/0231649 | A1 * | 9/2011 | Bollay | H04L 63/166 713/151 |

(Continued)

*Primary Examiner* — Hosuk Song
(74) *Attorney, Agent, or Firm* — Orrick, Herrington & Sutcliffe, LLP

(57) ABSTRACT

A Multi-Stage Acceleration System improves performance, security, and reduces data transferred for mobile devices using wireless networks by transforming protocols and data into an encrypted form that consumes far less bandwidth, lowers latency, and improves throughput. The Multi-Stage Acceleration System includes multiple stages running on the mobile device and multiple stages running in the cloud that provide security and data reduction for all types of network traffic from and to the mobile client, including but not limited to TCP/IP, UDP, HTTP, SSL/TLS, IMAP, POP, SMTP etc.

18 Claims, 30 Drawing Sheets

(56) References Cited

U.S. PATENT DOCUMENTS

| | | |
|---|---|---|
| 2012/0158828 A1* | 6/2012 | Ireland .............. G06F 17/30383 709/203 |
| 2012/0284461 A1 | 11/2012 | Larin et al. |
| 2013/0031337 A1 | 1/2013 | Larin et al. |
| 2013/0054523 A1 | 2/2013 | Anglin et al. |
| 2013/0124621 A1 | 5/2013 | Lepeska et al. |
| 2013/0198313 A1 | 8/2013 | Hayton et al. |
| 2014/0304464 A1 | 10/2014 | Bert |
| 2014/0344341 A1 | 11/2014 | Panzer et al. |

* cited by examiner

MULTI-STAGE ACCELERATION SYSTEM AND METHOD

CROSS-REFERENCE TO RELATED APPLICATIONS

This application claims priority to U.S. provisional patent application, Ser. No. 62/117,879, filed Feb. 18, 2015. Priority to the provisional patent application is expressly claimed, and the disclosure of the provisional application is hereby incorporated herein by reference in its entirety and for all purposes.

The following United States nonprovisional patent applications are fully owned by the assignee of the present application and are filed on the same date herewith. The disclosure of the nonprovisional patent applications are hereby incorporated herein by reference in their entireties and for all purposes:

"SYSTEM AND METHOD TO ELIMINATE DUPLICATE BYTE PATTERNS IN NETWORK STREAMS," U.S. patent application Ser. No. 15/047,591, filed Feb. 18, 2016; and "EXTENDED HTTP OBJECT CACHE SYSTEM AND METHOD," U.S. patent application Ser. No. 15/047,594, filed Feb. 18, 2016.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

The disclosed embodiments relate generally to mobile devices and computers communicating and accessing data across a network.

BACKGROUND

Mobile devices access data primarily from wireless networks, using traditional protocols such as Transmission Control Protocol/Internet Protocol(TCP/IP), Hypertext Transfer Protocol (HTTP), Hypertext Transfer Protocol over Transport Layer Security (also called HTTP Secure or HTTP over Secure Sockets Layer) (HTTPS), etc. These traditional protocols were developed on traditional wired networks where congestion is low and bandwidth is inexpensive and available. As a result, these traditional protocols are less efficient and consume more bandwidth than needed on wireless networks.

For example, public wireless fidelity (Wi-Fi) networks and cellular networks are seeing growth in devices and demand for data far greater than they can deliver. While wired networks can add more network capacity, wireless networks are limited to the available frequency spectrum.

In view of the foregoing, a need exists for an improved network data system and efficient protocols in an effort to overcome the aforementioned obstacles and deficiencies of conventional network systems.

SUMMARY

A Multi-Stage Acceleration System improves performance and security for mobile devices using wireless networks by transforming protocols and data into an encrypted form that consumes less bandwidth, lowers latency, and improves throughput.

Figure 1:
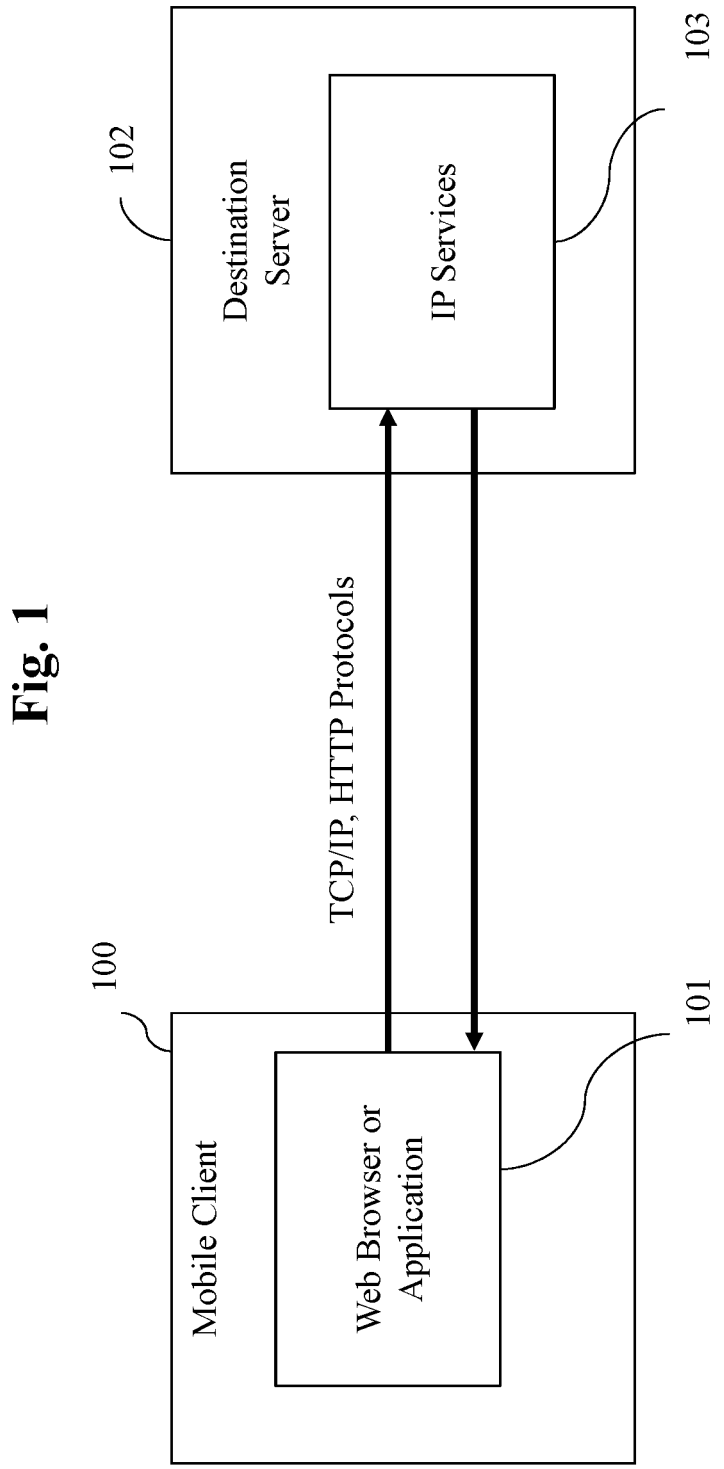
FIG. 1 illustrates one embodiment of a top-level network system diagram using standard protocols between network clients and servers.

It should be noted that the figures are not drawn to scale and that elements of similar structures or functions are generally represented by like reference numerals for illustrative purposes throughout the figures. It also should be noted that the figures are only intended to facilitate the description of the preferred embodiments. The figures do not illustrate every aspect of the described embodiments and do not limit the scope of the present disclosure.

DETAILED DESCRIPTION OF THE PREFERRED EMBODIMENTS

As shown in FIG. 1, an Application 101 running on a Mobile Client 100 communicates with IP Services 103 running on Destination Server 102 using standard protocols such as TCP/IP, HTTP etc. The Application 101 can also include Web Browsers and applications that make network requests. These standard protocols are optimized for interoperability and functionality and are not optimized for maintaining performance on congested wireless networks, minimized network data consumption, or securing data on public networks.

Figure 2:
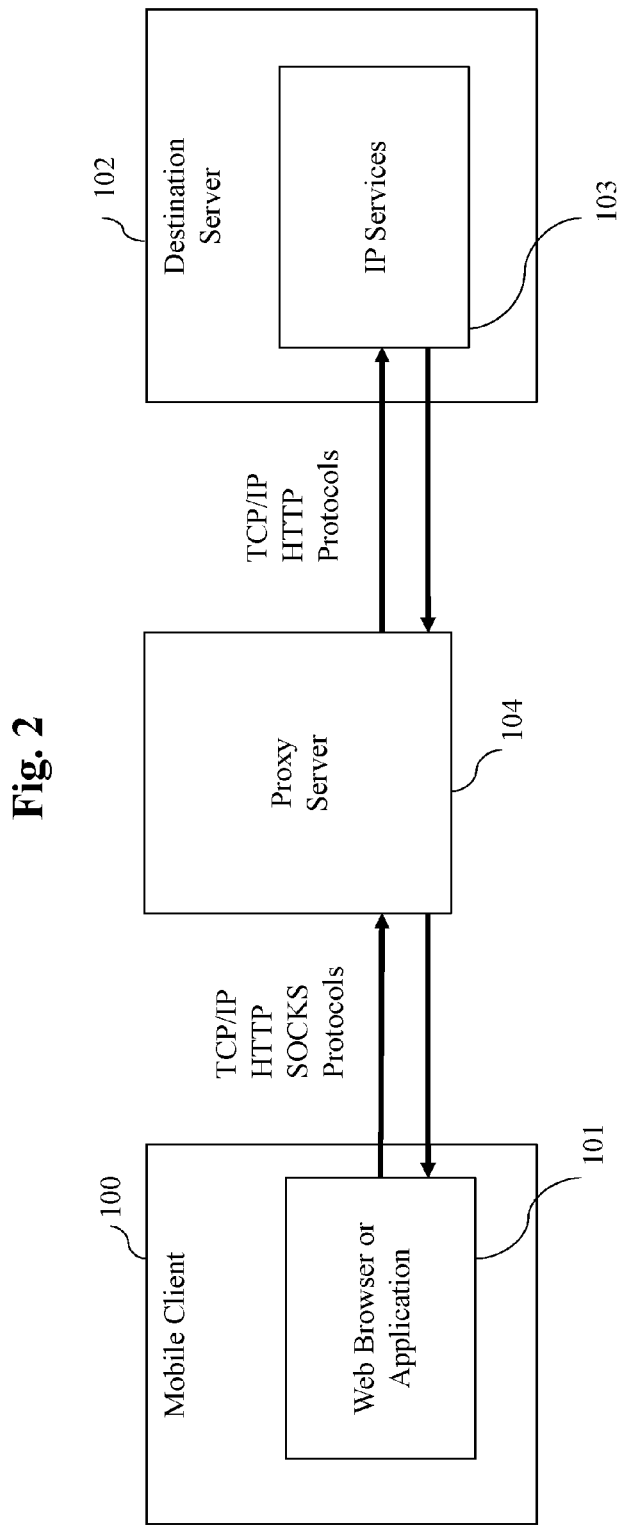
FIG. 2 illustrates another embodiment of the network system diagram of FIG. 1 communicating with conventional proxy servers.

FIG. 2 shows that Proxy servers can be used for network firewalls, caching data networks, etc. When using a proxy server, the Mobile Client 100 sends its request and data to a computer Proxy Server 104, which can act as a proxy for the Mobile Client 100 by sending the request and data to the Destination Server 102. Standard proxy servers run monolithically on a computer and communicate using standard protocols.

A Multi-Stage Acceleration System allows clients, particularly mobile devices and computers, to access information on a network by encoding standard protocols in a protocol that provides a 50-90% reduction in data, and maintains high throughput in spite of high latency, loss and congestion, as described below.

Figure 3:
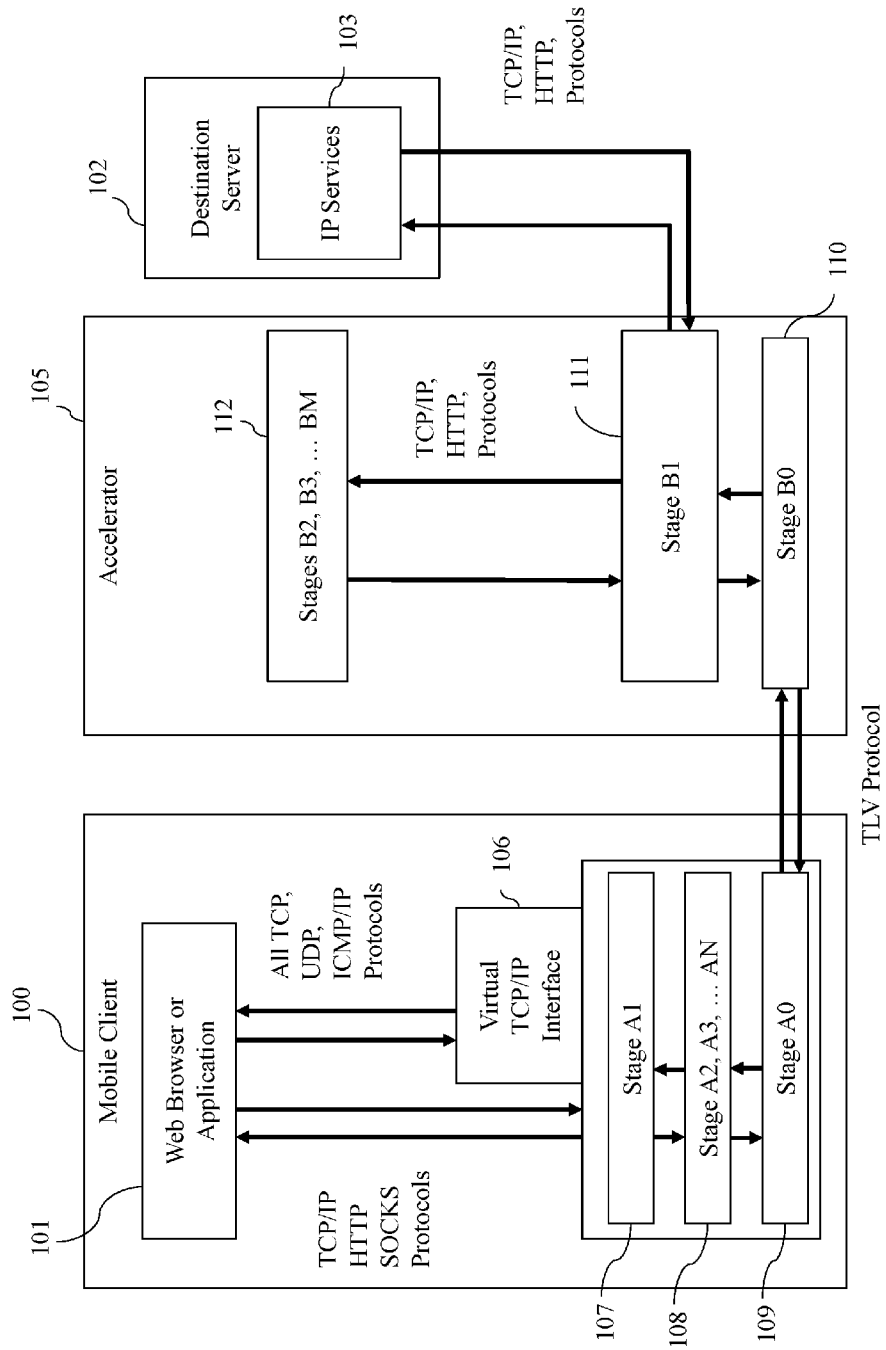
FIG. 3 illustrates one embodiment of a top-level block diagram of a Multi-Stage Acceleration system.

Turning to FIG. 3, a Multi-Stage Acceleration System includes multiple stages running on the Mobile Client 100 and an Accelerator 105. The Accelerator 105 can include a machine or a cluster of machines (to facilitate failover and load balancing) running server stages B0 110, B1 111, . . . BM 112 of the Multi-Stage Acceleration System. Client stages A0 109, A1 107, . . . AN 108 are client stages running on the Mobile Client 100. The stages running on the Mobile Client 100 are referred to as "Client Stages" and the stages running on the Accelerator are called "Server Stages". The Client Stages and Server Stages, while running on multiple machines, operate together to transparently operate as a proxy service communicating with standard protocols, such as TCP/IP, HTTP, HTTPS etc. to the Application 101 and IP Services 103 running on Destination Servers 102. The Application 101 and the protocols used by the Application 101 communicate with a local proxy service, while IP Services 103 of the Destination Servers 102 communicate with an Internet based proxy service.

The Server Stages include proxy services located on or adjacent to the Accelerator 105. The Server Stage B0 110 and Server Stage B1 111 are part of the core Multi-Stage Acceleration System. Server Stages B2, B3, . . . BM 112 can provide acceleration, data reduction and/or security services from a network layer through to an application layer of a standard Open Systems Interconnection (OSI) network model, including the ability to access third-party services such as firewalling, data caching, image processing, video processing, virus checking, malware, accounting, and monitoring. The Server Stages B2, B3, . . . BM 112 communicate with the Server Stage B1 111 using either standard HTTP/HTTPS or SOCKS protocol or proprietary protocols over TCP/IP.

The Client Stages include proxy services located with or adjacent to the Mobile Client 100. Client Stage A0 109 and Client Stage A1 107 are part of the core Multi-Stage Acceleration System. The Client Stages A2, A3, . . . AN are optional services that can provide additional services such as local caching, local accounting, local malware detection etc. The Client Stages and Server Stages can work in tandem or independent of each other. Thus, the number of Client Stages N and number of Server Stages M need not be the same.

FIG. 3 also illustrates an embodiment of how the Multi-Stage Acceleration System can include multiple computers and custom protocols to improve the performance and security between the Application 101 and the Destination Server 102. The Client Stages and Server Stages can operate together as a proxy server, which can run different portions of the acceleration and security services on multiple computers. The Client Stages and Server Stages use standard protocols to communicate with the Applications 101 and Destination Servers 102, but use a highly optimized and secure custom protocol called TLV5 (Tag Length Value version 5) to communicate between Client Stage A0 109 and Server Stage B0 110. Client Stage A0 109 and Server Stage B0 110 reduce the bandwidth consumed on the network over which they communicate substantially, secure all data transferred across that network and accelerate the rate at which the original data is transferred between the Application 101 and the Destination Servers 102.

In one embodiment, the TLV5 protocol message includes three fields: (a) TAG to indicate the message type; (b) LENGTH to indicate the length of the message; and (c) VALUE—the data of the message. While Client Stage A0 109 and Server Stage B0 110 provide security and data reduction that is commonly shared across all protocols, Client Stage A1 107 and Server Stage B1 111 provide protocol selection, session management and protocol specific data reduction.

The Multi-Stage Acceleration System advantageously can accelerate, reduce and secure network traffic. The Multi-Stage Acceleration System advantageously facilitates distribution of acceleration and proxy services across multiple Client Stages and Server Stages. The Multi-Stage Acceleration System supports any predetermined number of Client Stages and Server Stages.

As illustrated in FIG. 3, the Application 101 can access the IP Services 103 using standard IP, TCP, HTTP proxy and/or Sockets Secure (SOCKS) proxy protocols. In one embodiment, the Application 101 can be run on Mobile Client 100 accessing IP services 103 running on Destination Server 102 on the Internet. As illustrated in FIG. 3, Stage A1 107 can be associated with a virtual TCP/IP Interface 106 and can be run as an application on the Mobile Client 100. Server Stage B0 110, Server Stage B1 111, and Server Stages B2, B3, . . . BM 112 can be running on a remote computer (not shown) or cloud service (not shown). Server Stages B2, B3, . . . BM can be run as cloud services or on a remote computer that is the same as, or different from, the remote computer running Server Stage B0 110 and Server Stage B1 111. The IP Services 103 can be any type of services that can be accessed by IP based protocols, such as a Web Page, a Web Service, a File, a File System, a Directory, a Web Application, Audio, Video, a Data Unit, etc.

The Application 101 can access the IP services 103 via the Multi-Stage Acceleration System in any suitable manner. One manner, for example, uses proxy protocols, such as SOCKS or HTTP, which can be configured, in the application or on the computer or device running the Application 101, to send requests and connections to Client Stage A1 107. Additionally and/or alternatively, the Multi-Stage Acceleration System can utilize Internet Protocol (IP) routing to route IP packets via a Virtual IP Interface 106, which will send sessions and messages to Client Stage A1 107.

Figure 4:
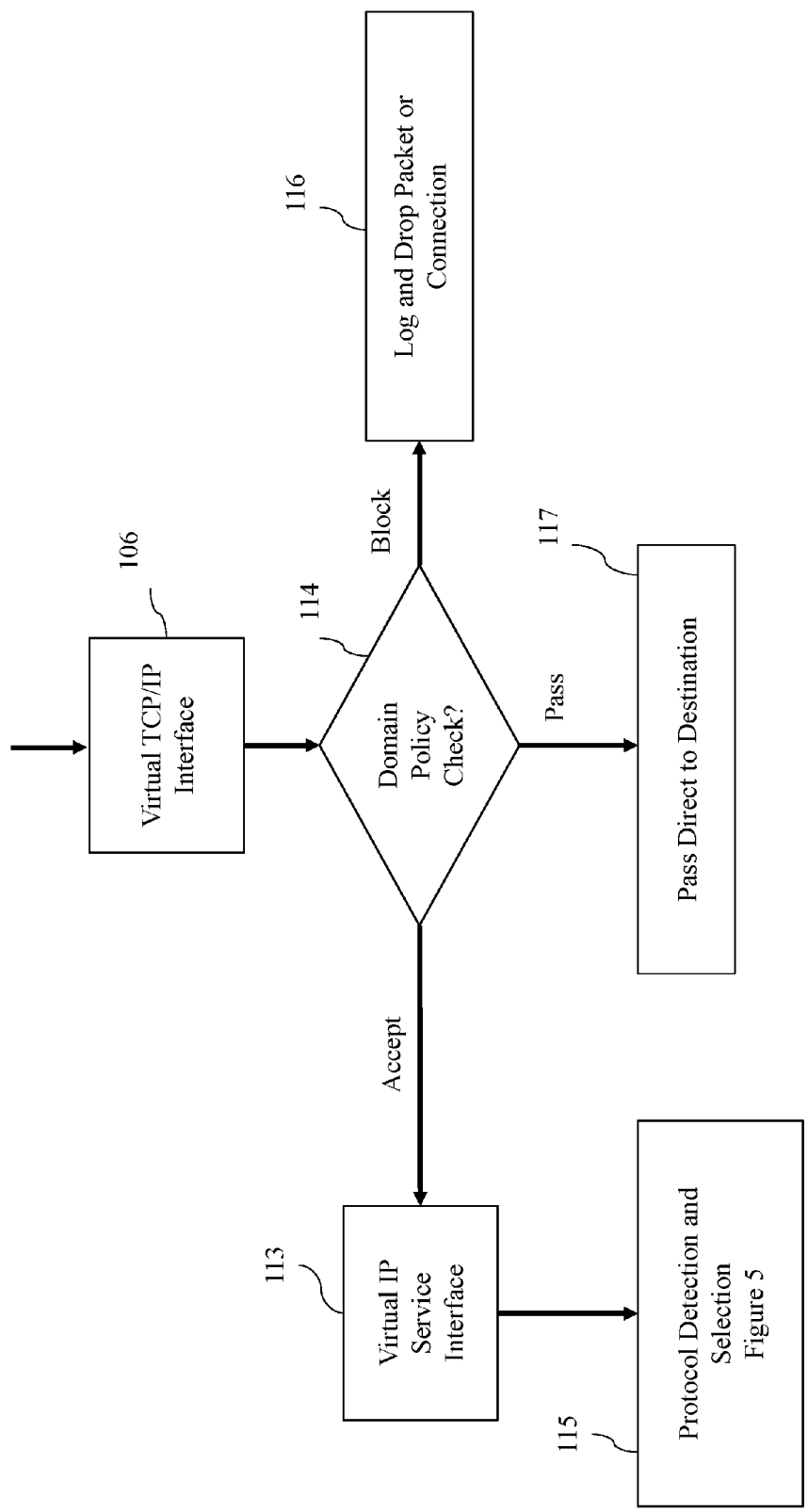
FIG. 4 illustrates one embodiment of a flow chart for processing a network request at the Virtual Interface of FIG. 3.

FIG. 4 is a flow chart illustrating an embodiment for processing network packets at the Virtual IP Interface 106 of the Multi-Stage Acceleration System. The Virtual IP Interface 106 can masquerade the actual IP addresses of the IP Services 103 and includes a TCP/IP protocol stack to interface IP packets from Application 101 as sessions and messages to Client Stage A1 107.

In FIG. 4, when the Application 101 initiates a connection request to IP Services 103, the connection request reaches Client Stage A1 107 through the Virtual IP Interface 106. Step 114, Client Stage A1 107 assesses the packet IP headers with the Domain Policy Check. The Domain Policy Check at step 114, evaluates fields such as IP addresses, protocols and ports to determine actions such as "accept", "pass" or "block". The "block" action, at 116, blocks access to IP Services 103 by dropping the IP packets. The "pass" action, at 117, passes IP packets to IP Services 103 directly, bypassing the Multi-Stage Acceleration System. The "accept" action results in creation of a Virtual IP Service Interface 113 to process the IP packets, and sending the resulting sessions, data and messages on to Protocol Detection and Selection, at 115, depicted in FIG. 5.

Figure 5:
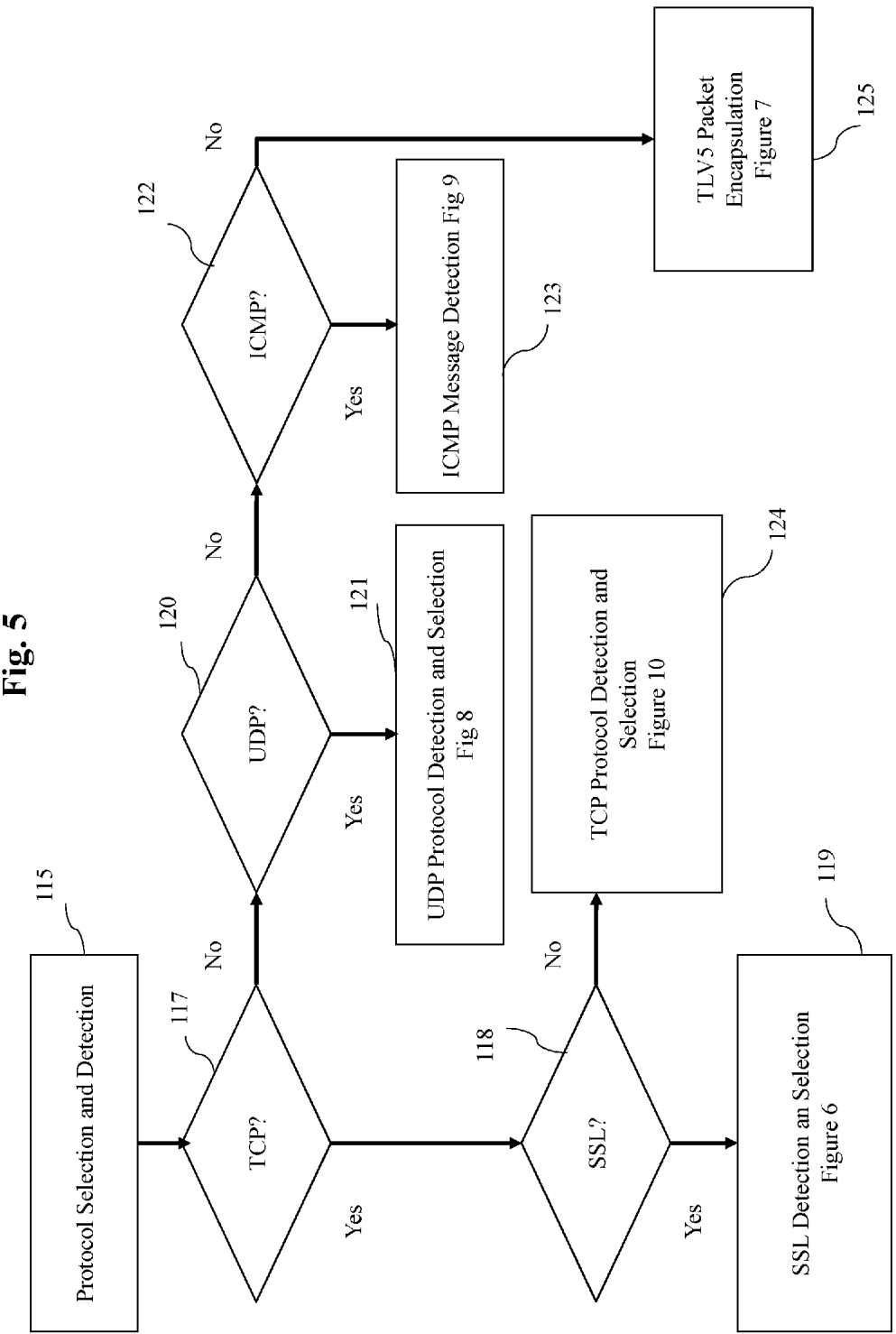
FIG. 5 illustrates one embodiment of a flow chart for selecting protocols using the Protocol Selection And Detection of FIG. 3.
Figure 6:
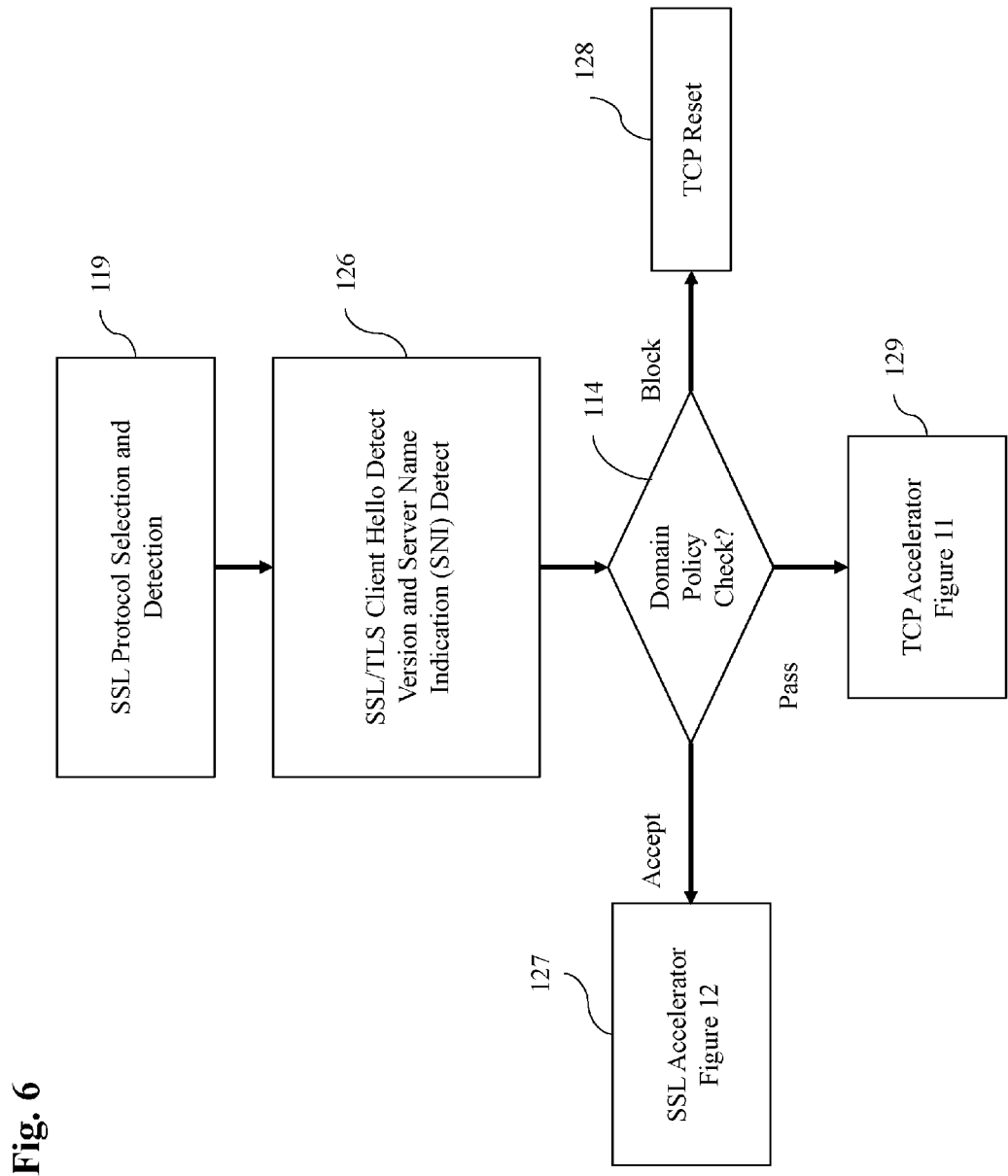
FIG. 6 illustrates one embodiment of a flow chart for detecting SSL protocols using the SSL Protocol Detection and Selection of FIG. 3.
Figure 8:
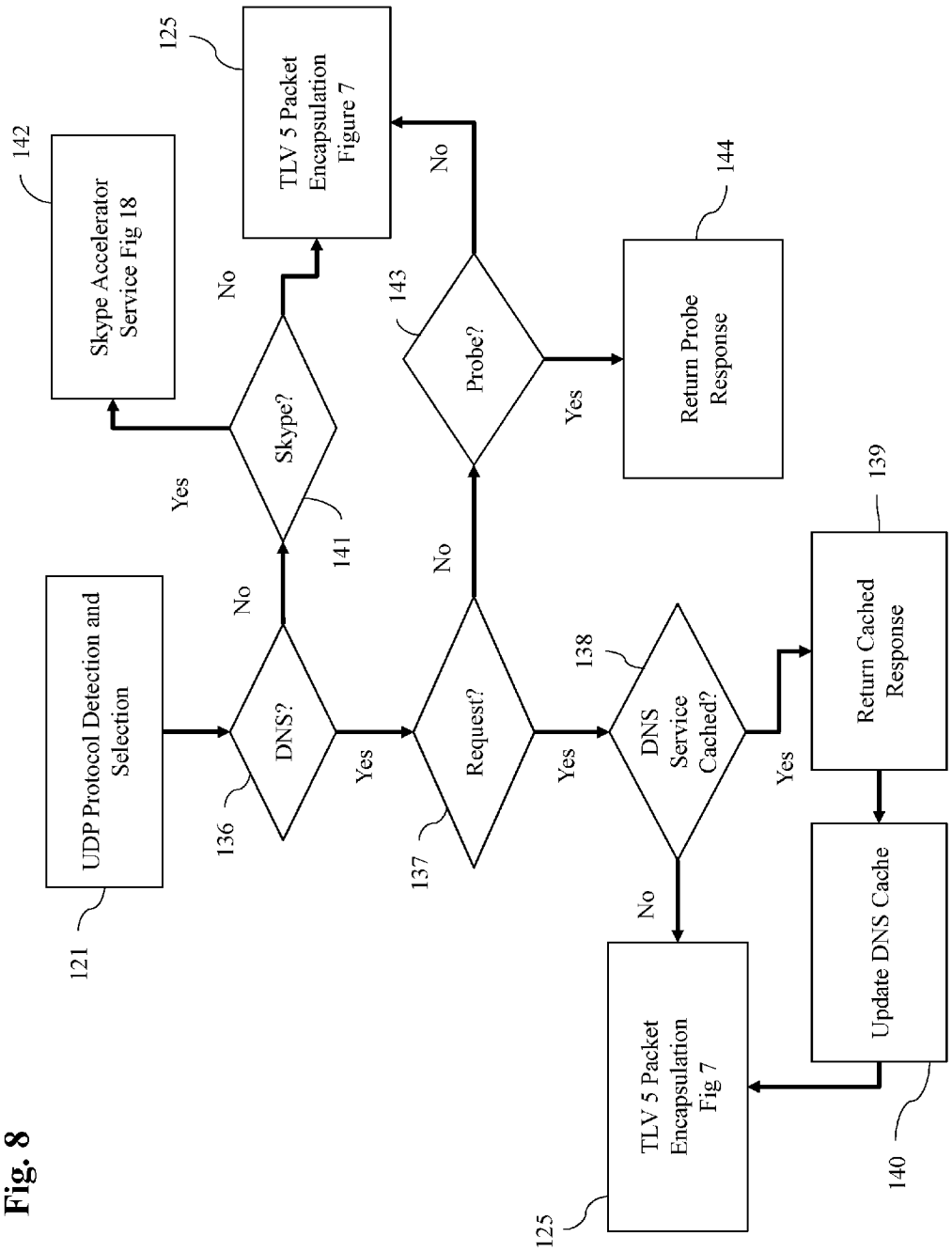
FIG. 8 illustrates one embodiment of a flow chart for detecting UDP protocols using the UDP Protocol Detection and Selection of FIG. 3.
Figure 9:
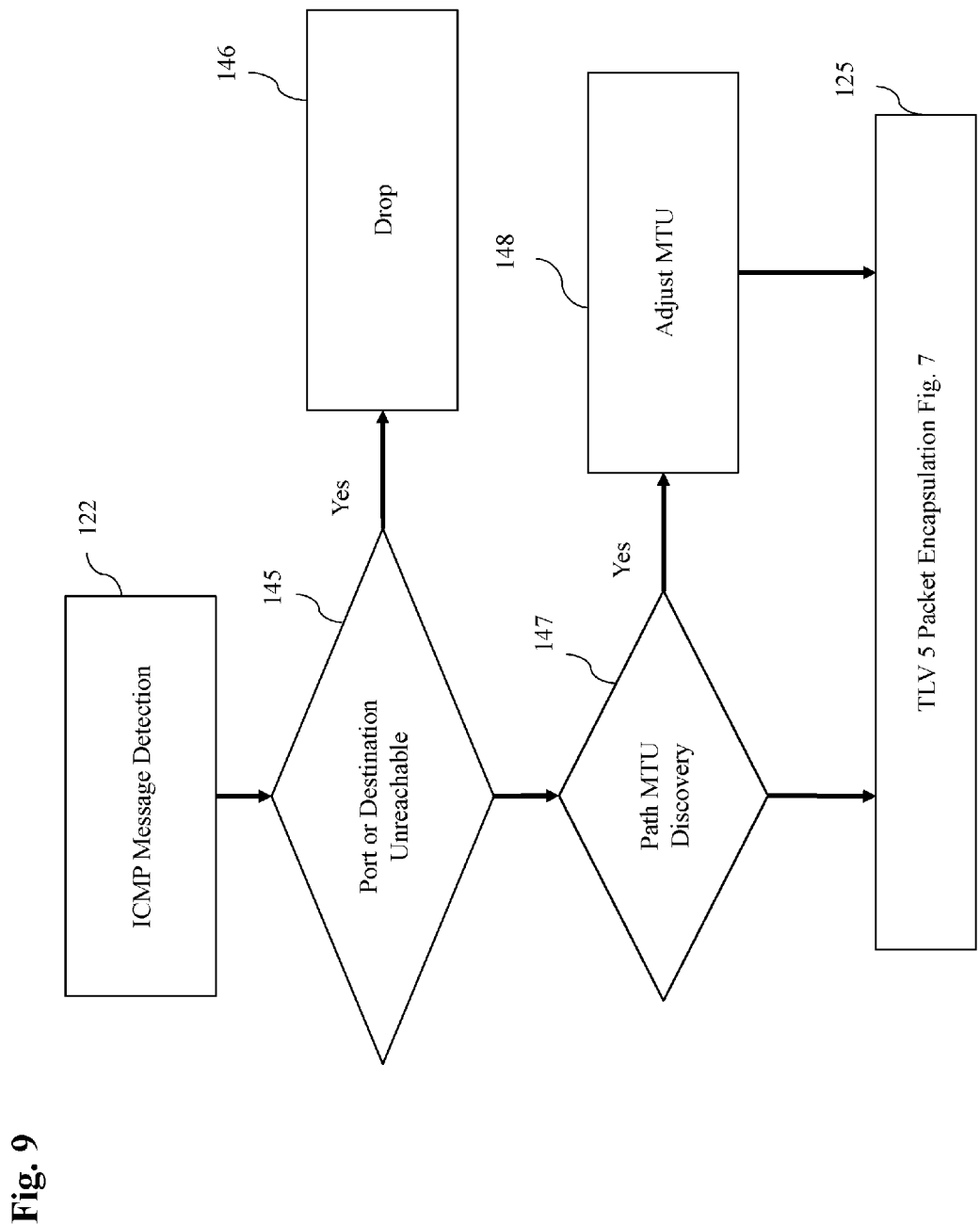
FIG. 9 illustrates one embodiment of a flow chart for detecting ICMP messages using the ICMP Message Detection of FIG. 3.
Figure 10:
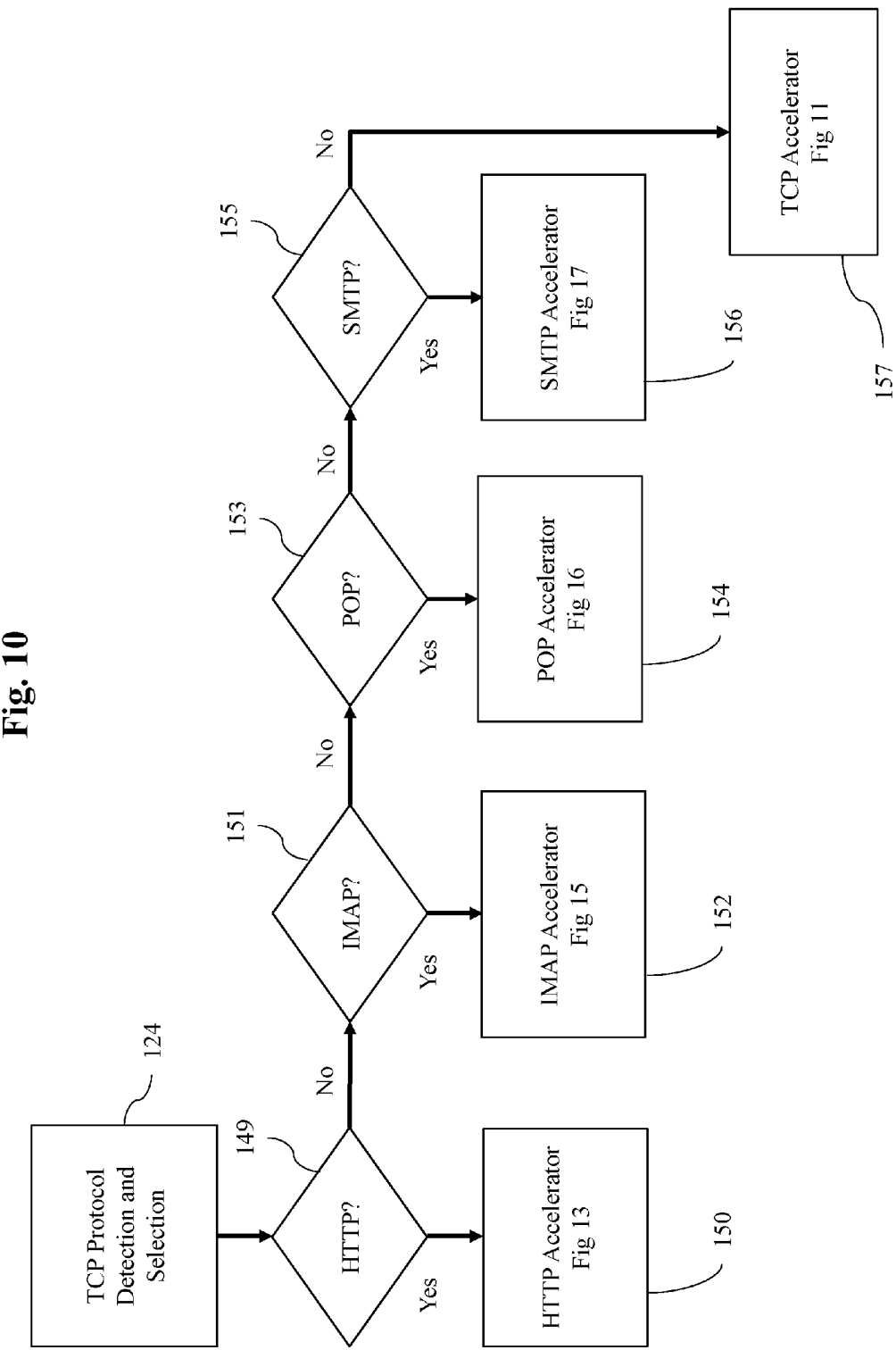
FIG. 10 illustrates one embodiment of a flow chart for detecting TCP protocols using the TCP Protocol Detection and Selection of FIG. 3.

FIG. 5 is a flow chart diagram depicting an embodiment of a manner for detecting the IP Protocol and selecting the methods and algorithms that will be used by the Client Stage A1 107 of the Multi-Stage Acceleration System to accelerate, reduce and secure the network session. If the protocol is TCP at step 117, the next step 118 is to determine if the session will be encrypted with Secure Sockets Layer (SSL) or Transport Layer Security (TLS). If Client Stage A1 107 determines at step 118 that this is an SSL session, the next step 119 is SSL Detection and Selection, as depicted in FIG. 6. If the TCP session is not going to be encrypted at step 118, the session will be passed to TCP Protocol Detection and Selection 124 as depicted in FIG. 10. If the protocol is UDP (User Datagram Protocol) at step 120, for example, the session will be passed to UDP Protocol Detection and Selection 121 as depicted in FIG. 8. If the protocol is ICMP at step 122, the session will be passed to ICMP Message Detection 123 as depicted in FIG. 9. All other protocols will be passed to TLV 5 Packet Encapsulation 125 as depicted in FIG. 7.

Figure 11:
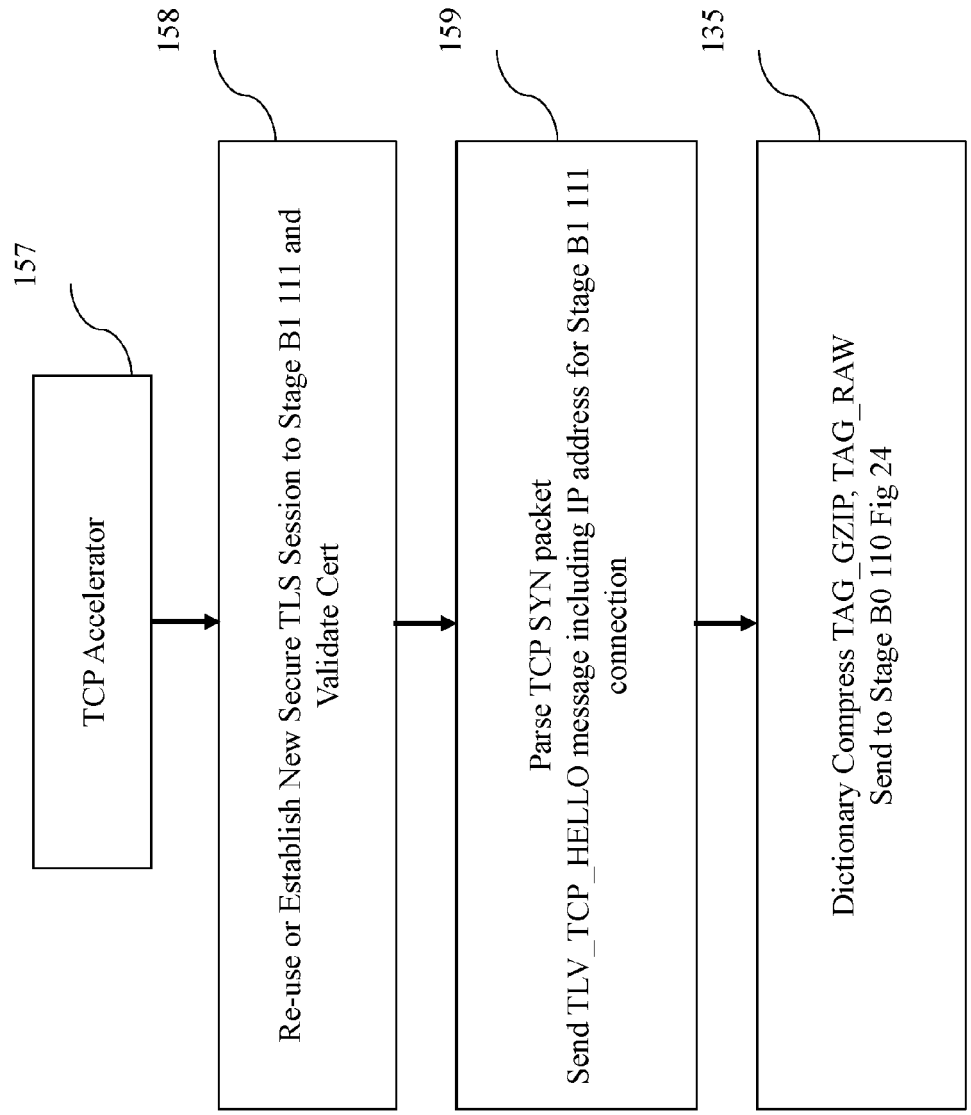
FIG. 11 illustrates one embodiment of a flow chart for accelerating TCP traffic using the TCP Accelerator of FIG. 3.
Figure 12:
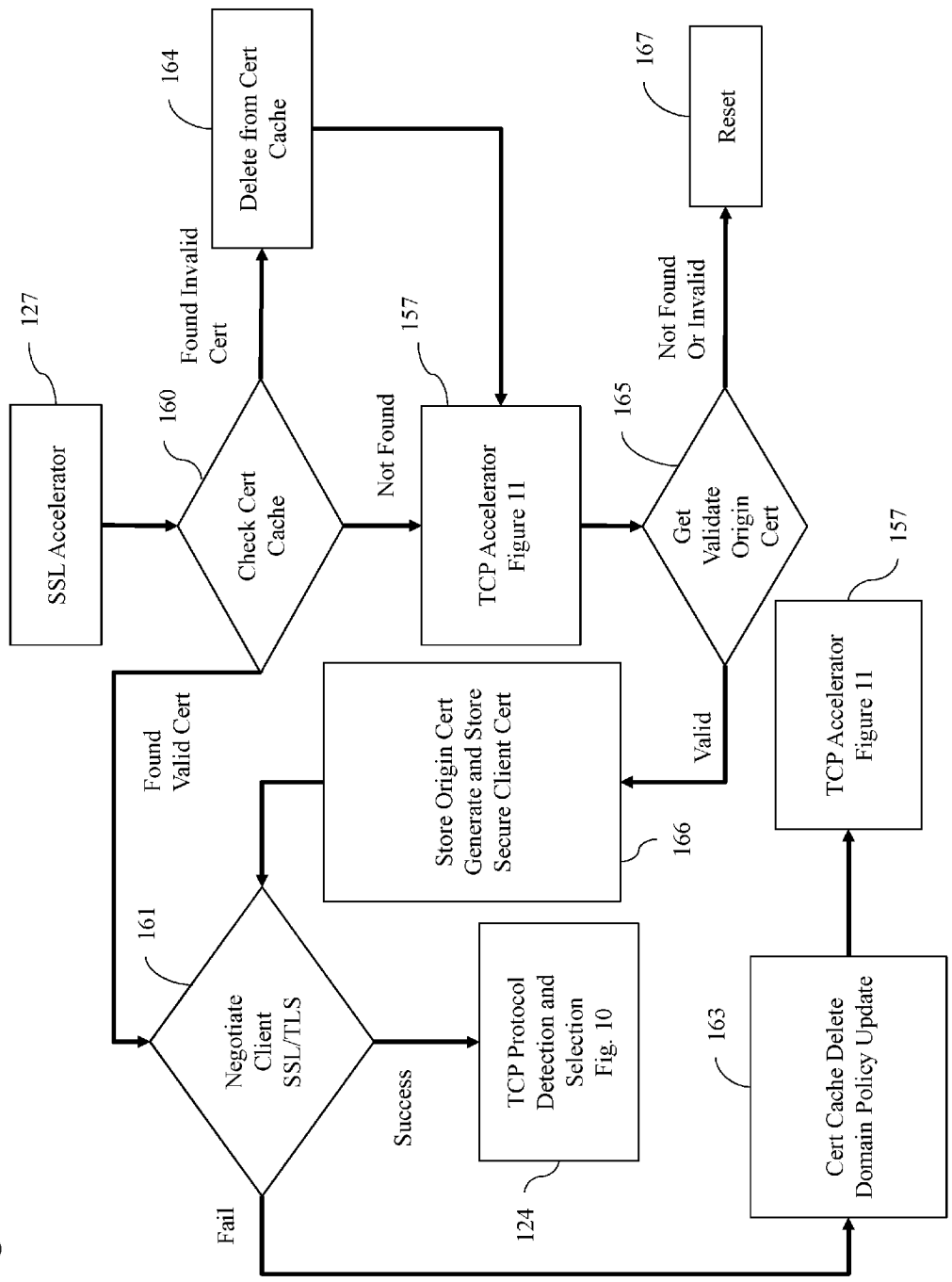
FIG. 12 illustrates one embodiment of a flow chart for accelerating SSL traffic using the SSL Accelerator of FIG. 3.

FIG. 6 is a flow chart diagram depicting and embodiment of the detection of encryption methods SSL and TLS and selecting the method to apply to a network session, at Client Stage A1 107. The SSL/TLS are detected by scanning the first data bytes for a version of an SSL/TLS client hello. If an SSL/TLS client hello is found, the version, destination IP address and optionally the Server Name Indicator (SNI) are sent to the Domain Policy Check 114. The Domain Policy Check 114 responds with action "block", "pass" or "accept". The Domain Policy Check 114 may be configured to block insecure destinations, SNI's or SSL/TLS versions, in which case sending a TCP reset blocks that network session in step 128. If the Domain Policy Check 114 responds with "pass", the network session is forwarded to TCP Accelerator 129 as depicted in FIG. 11. If the Domain Policy Check 114 responds with "accept" action that session is forwarded to the SSL Accelerator 127, as depicted in FIG. 12.

Figure 7:
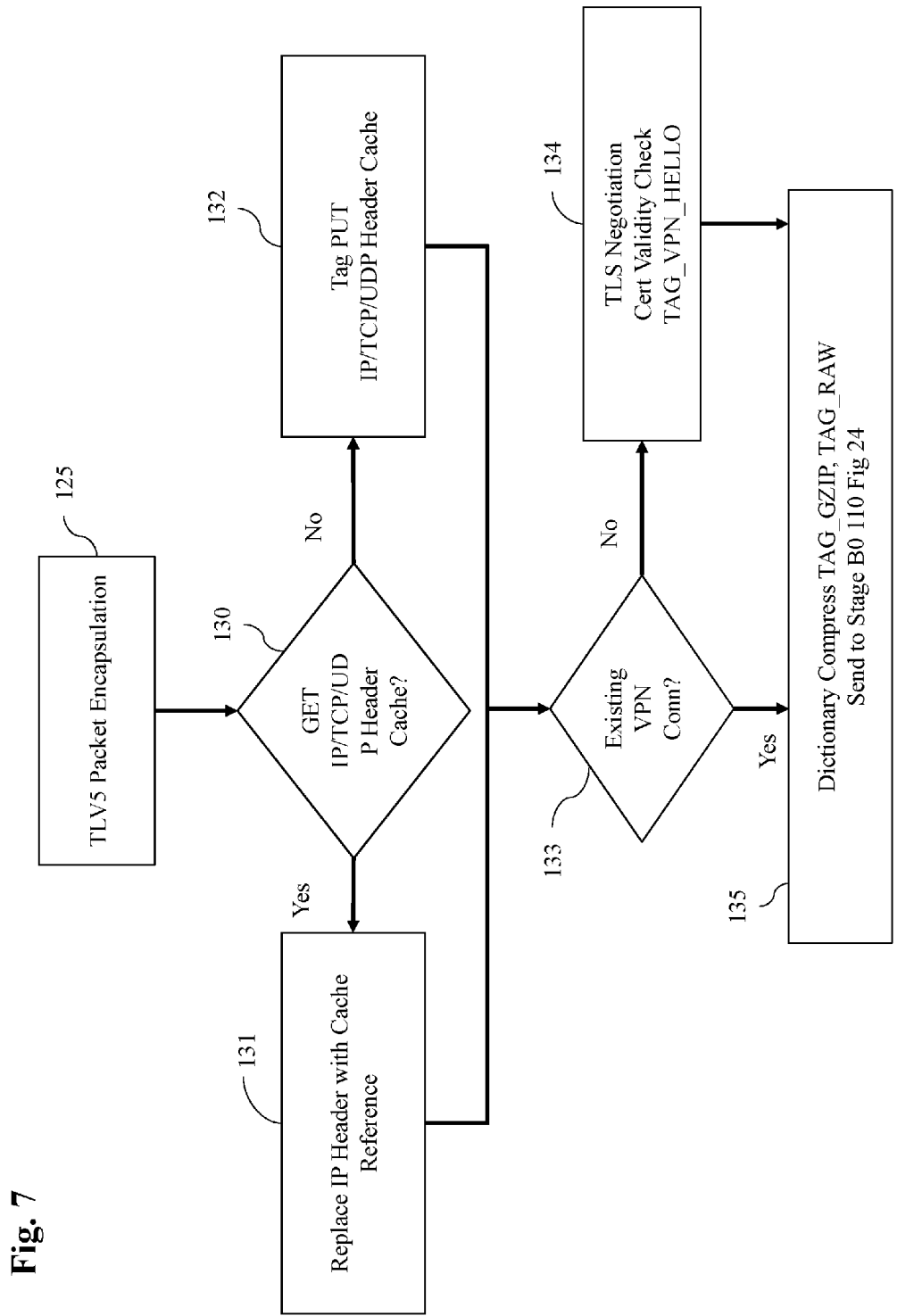
FIG. 7 illustrates one embodiment of a flow chart for encapsulating packets using the TLV5 Packet Encapsulation of FIG. 3.

FIG. 7 is a flow chart diagram depicting an embodiment of TLV 5 packet encapsulation 125 at Client Stage A0 109. TLV 5 packet encapsulation sends IP packets from Client Stage A0 109 to Server Stage B0 110. On receiving an IP packet at step 125, Client Stage A0 109 passes the IP packet header through the Client Stage A0 109 IP header cache, which compares the IP header and the TCP or UDP headers, in step 130. If there is a match in step 130, the packet header is replaced with an IP header cache reference tag in step 132. If there is not a match in step 130, that IP packet header is tagged and put into the Client Stage A0 109 IP header cache. Then, in step 133, a check is performed to see if there is an existing VPN connection to Server Stage B0 110. If no existing VPN Connection to Server Stage B0 110 is found in step 133, a new VPN connection is created by negotiating a TLS session with Server Stage B0 110 and validating the certificate of Server Stage B0 110, and a TAG_VPN_HELLO is sent. If an existing VPN Connection is found in step 133 or a new VPN Connection is created in step 134, Client Stage A0 109 sends the IP packet including the data and headers to Server Stage B0 110, in step 135.

At step 135, Client Stage A0 109 does lossless data compression to reduce the size of and time spent transmitting data, resulting in acceleration and data savings. All data received as input to step 135 is compressed using a dictionary compression algorithm such as DEFLATE, and if the resulting data is smaller than the original, the compressed data is sent with TLV5 TAG_GZIP message, otherwise the original data is sent with a TLV5 TAG_RAW message.

FIG. 8 is a flow chart diagram depicting an embodiment of UDP Protocol Detection and Selection 121 at Client Stage A1 107, where an IP/UDP packet is parsed to determine the protocol. In step 136, Client Stage A1 107 checks to see if the packet contains a DNS (Domain Name System) packet. If the answer to step 136 is yes, then in step 137, the DNS packet is checked to see if it is a DNS Request. If the answer to step 137 is yes, then in step 138 the DNS cache on Client Stage A1 107 is searched for a DNS response to that DNS request. If a cached DNS response is found, then in step 139, the cached DNS response is returned to the Application 101 and the DNS cache on Client Stage A1 107 is updated in step 140. Then the DNS request is forwarded to TLV 5 Packet Encapsulation 125 as depicted in FIG. 7. If in step 143, the DNS packet is a DNS Probe packet, then a positive probe response is returned in step 144. If in step 136, the packet is not found to be a DNS packet, the packet is checked to see if it contains Skype data in step 141. If the packet is a Skype packet, the packet is forwarded to the Skype Acceleration Service FIG. 18. If the answer at step 141 is no, then the packet is forwarded to the TLV 5 Packet Encapsulation 125 as depicted in FIG. 7.

FIG. 9 is a flow chart diagram depicting an embodiment of ICMP (Internet Control Message Protocol) Message Detection 122 at Client Stage A1 107. On receiving an ICMP message, Client Stage A1 107 checks the ICMP message to see if it is a "Host or Port unreachable" message from the Mobile Client 100, in step 145. If yes, the ICMP message is dropped in step 146, for security reasons. If the ICMP message is a Path MTU (Maximum Transmission Unit) Discovery message and the Client Stage A1 107 is running as a Virtual Private Network (VPN), the ICMP MTU message is updated with the preferred MTU of the Client Stage A1 107's VPN. Then the ICMP MTU message is forwarded to the TLV 5 Packet Encapsulation 125 as depicted in FIG. 7.

Figure 13:
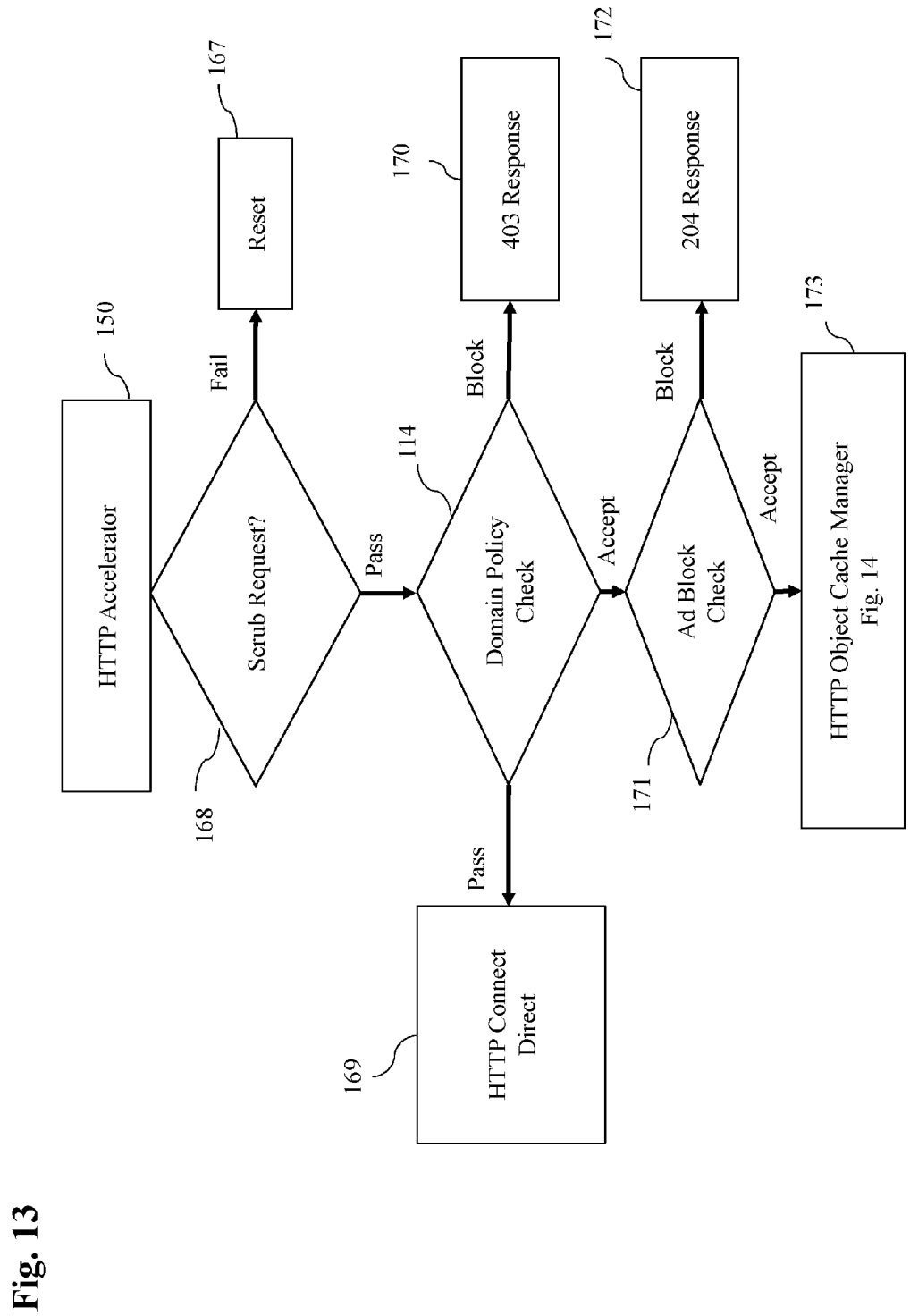
FIG. 13 illustrates one embodiment of a flow chart for accelerating HTTP traffic using the HTTP Accelerator of FIG. 3.
Figure 15:
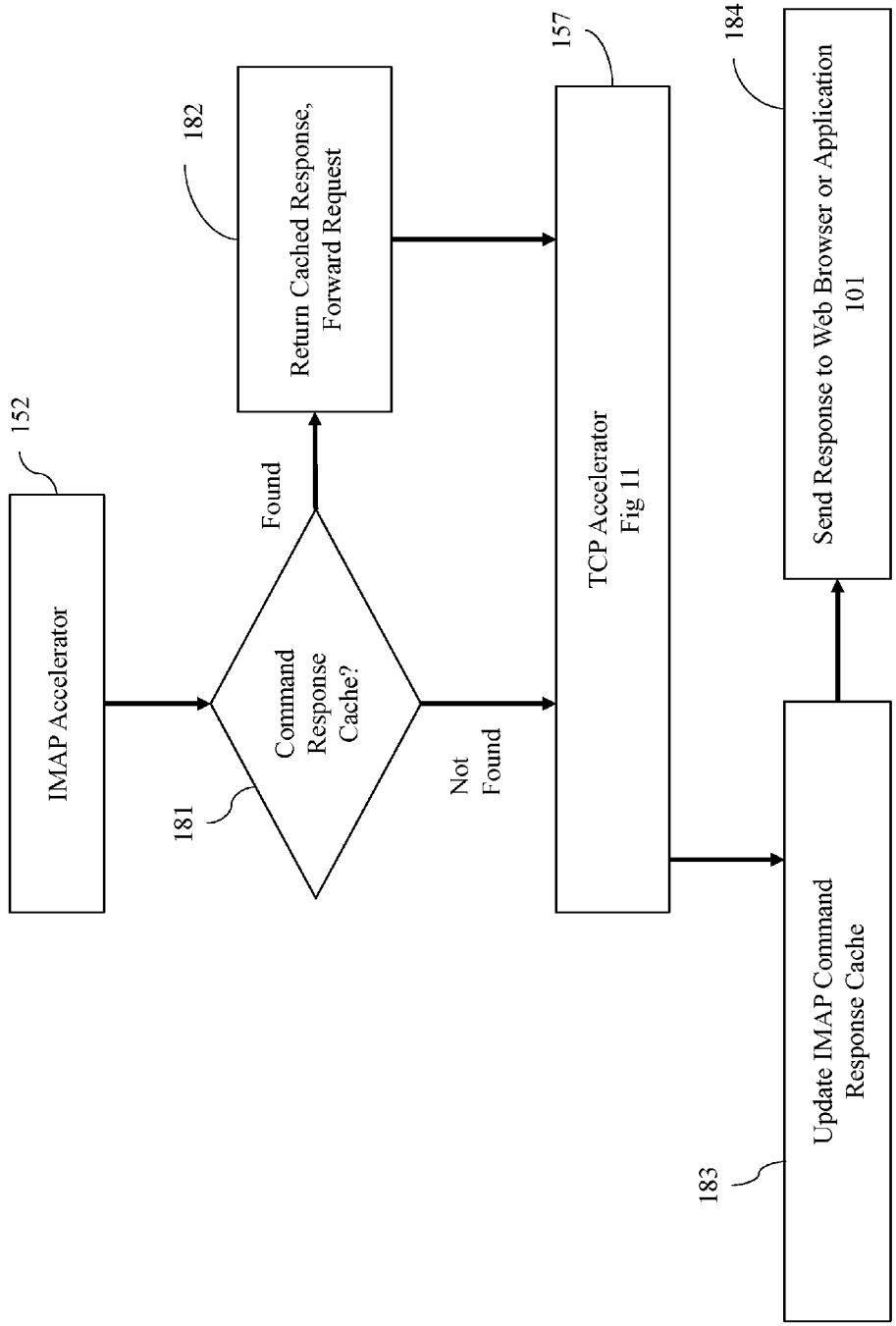
FIG. 15 illustrates one embodiment of a flow chart for accelerating IMAP traffic using the IMAP Accelerator of FIG. 3.
Figure 16:
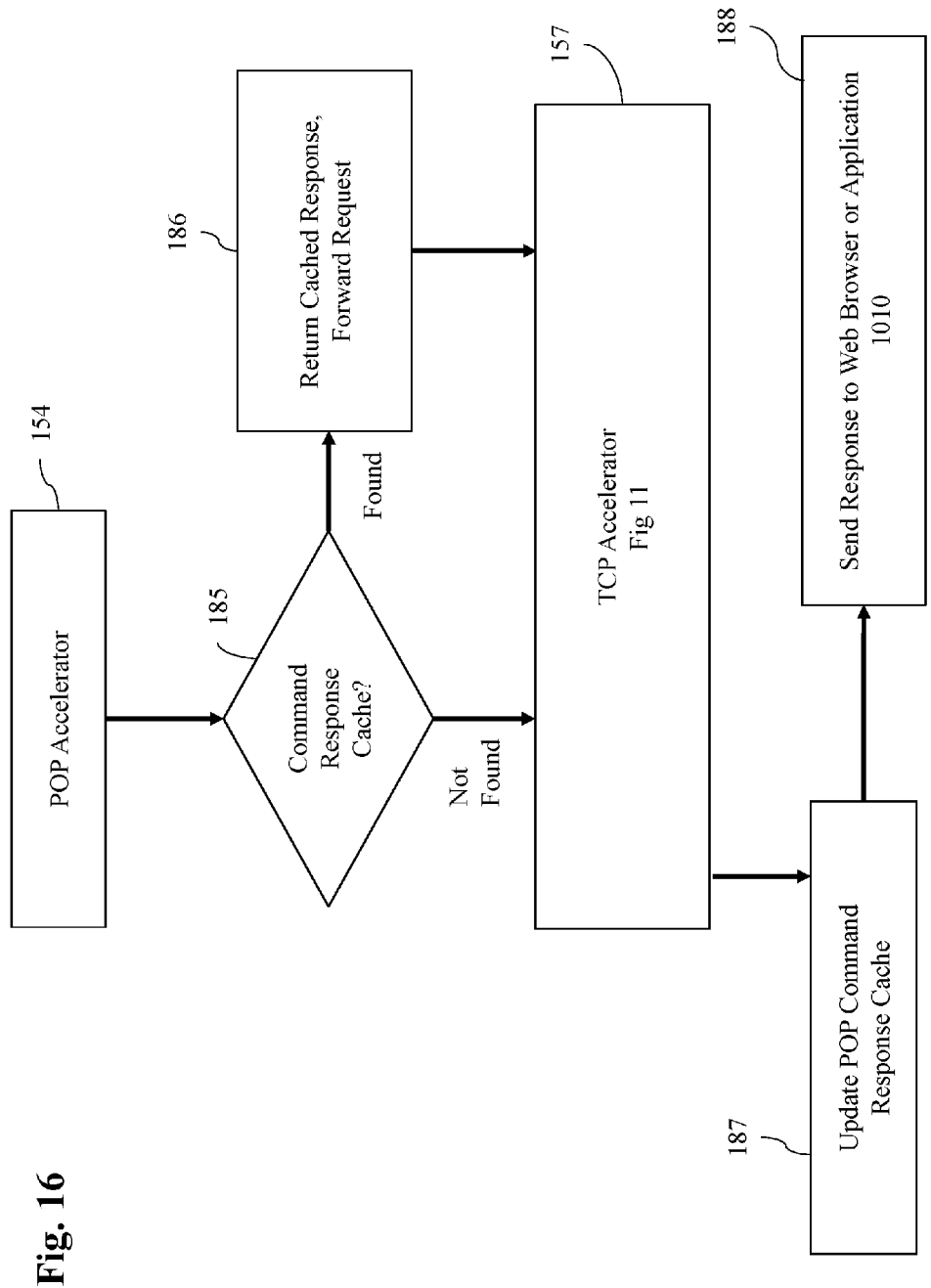
FIG. 16 illustrates one embodiment of a flow chart for accelerating POP traffic using the POP Accelerator of FIG. 3.
Figure 17:
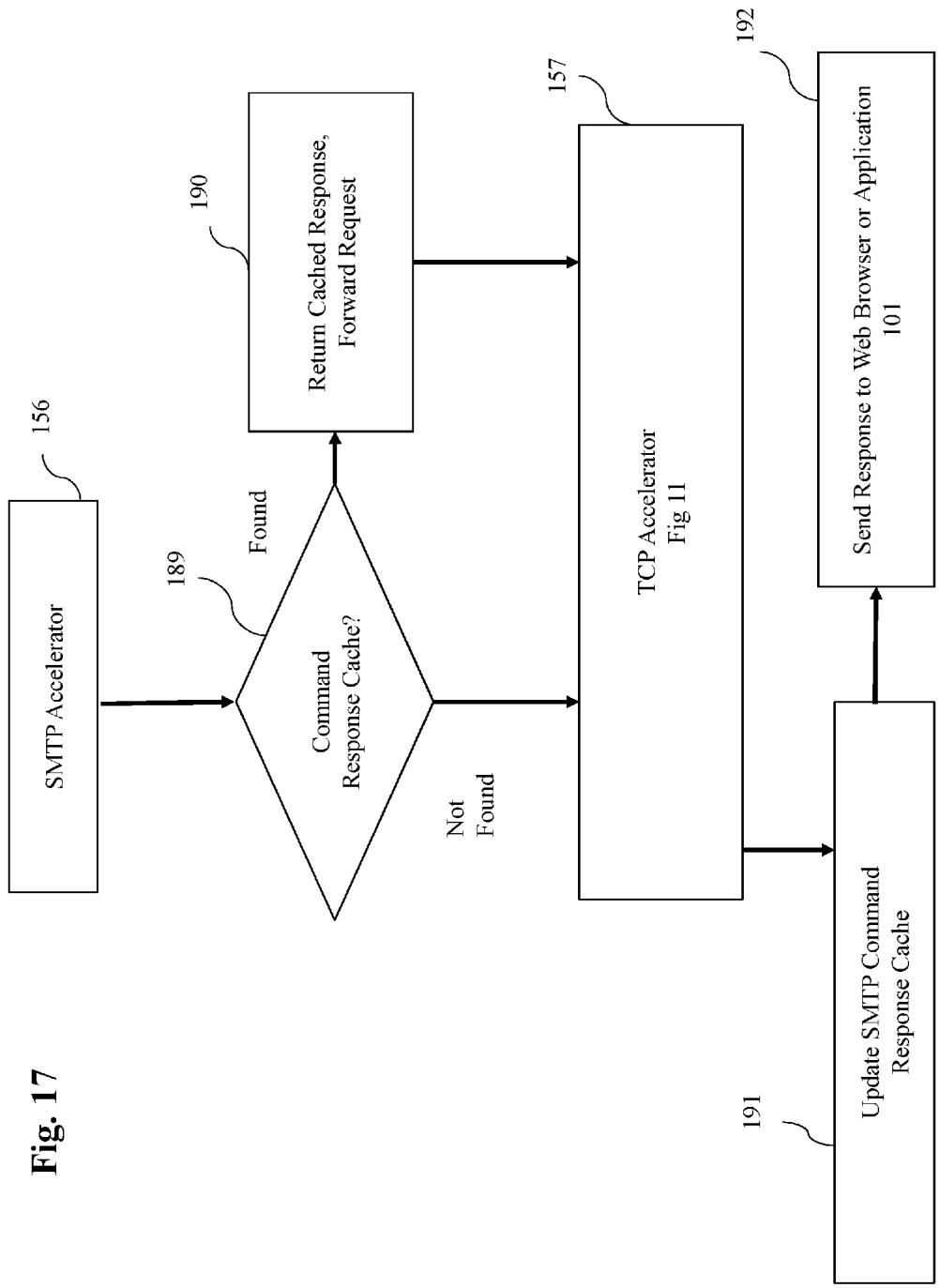
FIG. 17 illustrates one embodiment of a flow chart for accelerating SMTP traffic using the SMTP Accelerator of FIG. 3.

FIG. 10 is a flow chart diagram depicting an embodiment of TCP Protocol Detection and Selection 124 at Client Stage A1 107. Client Stage A1 107 has protocol specific acceleration for certain client-initiated protocols such as HTTP, IMAP (Internet Message Access Protocol), POP (Post Office Protocol) and SMTP (Simple Mail Transfer Protocol). Client Stage A1 107 also has support to add pluggable modules for accelerating other protocols. The initial data of a network session started by the Application 101 is scanned for HTTP requests or IMAP, POP or SMTP commands, in steps 149, 151, 153 and 155 respectively. If none of the known commands or requests of HTTP, IMAP, POP or SMTP are found in the initial data in steps 149, 151, 151 and 155, or the protocol is server-initiated (i.e. the first data is sent by the IP Services 103), the network session is handled by the TCP Accelerator 157 as depicted in FIG. 11. If an HTTP request is found at step 149, this network session is passed to the HTTP Accelerator 150 as depicted in FIG. 13. If an IMAP command is found in step 151, this network session is passed to the IMAP Acceleration Service 152 as depicted in FIG. 15. If a POP command is found in step 153, this network session is passed to the POP Accelerator 154 as depicted in FIG. 16. If an SMTP command is found in step 155, this network session is passed to the SMTP Accelerator 156 as depicted in FIG. 17.

FIG. 11 is a flow chart diagram depicting an embodiment of the processing of TCP traffic at TCP Accelerator 157 on Client Stage A1 107. The TCP Accelerator 157 uses the TLV5 protocol to communicate with Server Stage B1 111 of the Accelerator 105.

In step 158, all data transmitted by Client Stage A1 107 is encrypted with the most secure protocols and encryption algorithms available, such as TLSv3 (Transport Layer Security) with AES-2048 (Advanced Encryption Standard). For the highest security the data maybe doubly encrypted. In step 158, the TCP and TLS encryption sessions are pre-negotiated and re-used to eliminate the round trip delay incurred with each TCP session from the Application 101 to the IP Services 103. In Step 158, Client Stage A1 107 also manages the TCP protocol to maintain throughput despite packet loss and high latency that often occurs on last mile wireless networks.

In step 159, the TCP Accelerator 157 parses the TCP SYN packet to identify the IP Address and port of the IP Services 103, and sends a TLV_TCP_HELLO to the TCP Service 228 at Server Stage B1 111. The TLV_TCP_HELLO includes the IP Address and port of the IP Services 103 so that the TCP Service 228 at Server Stage B1 111 can initiate the TCP session with the IP Services 103 on behalf of the TCP Accelerator 157. Then in step 135, the TCP Accelerator 157 sends the data to Server Stage B0 110 running on the Accelerator 105. When the TCP Accelerator detects congestion, packet loss or weakened signal on the last mile wireless network, the TCP MSS (Maximum Segment Size) is reduced which results in higher throughput on the wireless network. Minimizing data transmitted and management of TCP data transmission results in acceleration and high throughput even in degraded wireless network conditions.

FIG. 12 is a flow chart diagram depicting an embodiment of acceleration of SSL/TLS traffic at SSL Accelerator 127 at Client Stage A1 107. For SSL Acceleration to work, a root Certificate Authority certificate RootCA can be installed on the Mobile Client 100 at the time of enabling the SSL Accelerator 127 or at the time of installation of the Multi-Stage Acceleration System on the Mobile Client 100. The private key RootPKey corresponding to the RootCA is stored in Client Stage A1 107. The SSL Accelerator 127 behaves like an SSL proxy by providing a locally generated certificate using the RootPkey, to the Application 101. By being an SSL Proxy, the SSL Accelerator 127 can inspect the unencrypted data sent from the Application 101. Encrypted data, by its nature, is highly uncompressible. By having access to the unencrypted data, the SSL Accelerator can make use of all the mechanisms of the Multi-Stage Acceleration System to achieve data reduction between the Mobile Client 100 and the Accelerator 105. As stated earlier, all the data transferred between Mobile Client 100 and the Accelerator 105 is encrypted and so data security is not compromised. The TCP Service 228 running on the Accelerator 105 acts as the other end of the SSL proxy when it connects to the IP Services 103 on behalf of the Application 101, as described in FIG. 26.

Turning to FIG. 12, the SSL Accelerator 127 maintains a "Certificate Cache" of the original certificates of the IP Services 103 and the local certificates generated for satisfying SSL/TLS sessions from the Application 101. In step 160, if the SSL Accelerator 127 finds a valid generated SSL/TLS certificate in the Certificate Cache, the valid SSL/TLS certificate is used to complete SSL/TLS negotiation with the Application 101. If in step 160, a valid certificate is not found in the Certificate Cache, a new session is initiated with Server Stage B1 111 using the TCP Accelerator 157 as depicted in FIG. 11. As described in FIG. 26, the TCP Service 228 running on Server Stage B1 111 returns the original SSL/TLS certificate from the IP Services 103 running on the Destination Server 102 identified by the IP address or SNI determined by the SSL/TLS detection depicted in FIG. 6. When the SSL Accelerator 127 runs step 165, if the original SSL/TLS certificate is not found or not valid, the session with the Application 101 is terminated (also known as Reset). If in step 165, the original SSL/TLC certificate is found to be valid, then in step 166, the original SSL/TLS certificate is stored in the Certificate Cache and a new matching certificate is generated, signed using RootPkey mentioned earlier, and stored in the Certificate Cache. Then in step 161, the new matching certificate is then used to negotiate SSL/TLS encryption with the Application 101. The session is then passed to TCP Protocol Detection and Selection 124 as depicted in FIG. 10. If in step 161, negotiation of SSL/TLS with the generated certificate fails, the SSL Accelerator 127 marks the Destination Server 102 as not allowing SSL Acceleration, so future requests to the Destination Server 102 will not be attempted to go through the SSL Accelerator 127, and forwards this session to the TCP Accelerator 157 as described in FIG. 11.

FIG. 13 is a flow chart diagram depicting an embodiment of the acceleration of HTTP traffic at HTTP Accelerator 150 running at Client Stage A1 107. When an HTTP request arrives at the HTTP Accelerator 150, the HTTP Request is "scrubbed" in step 168, which involves parsing the HTTP request line and HTTP Request headers to confirm the integrity and validity of the HTTP request. In Step 168, the HTTP Accelerator 150 ensures proper termination, presence of a host line, cleaning up of cookies and tracker objects and converting certain http requests to https, depending upon the user's settings and the source of the HTTP request. If step 168 results in a pass, the HTTP Request's URL (Uniform Resource Locator) and destination IP address are passed to the Domain Policy Check in step 114, which can return "block", "pass" or "accept" actions. If the Domain Policy Check 114 returns "block", the HTTP Request is blocked and an HTTP 403 error response is returned to the Application 101. If step 114 returns "pass", then the request is forwarded directly to the IP Services 103 and the Multi-Stage Acceleration System is bypassed. If step 114 returns "accept", then the URL is forwarded to the Ad Block check in step 171. If the Ad Block check 171 determines that the URL needs to be blocked, then in step 172, an HTTP 204 Response is returned to the Application 101. If step 171 returns "accept", the HTTP Request is forwarded to the HTTP Object Cache Manager 173 as described in FIG. 14.

Figure 14:
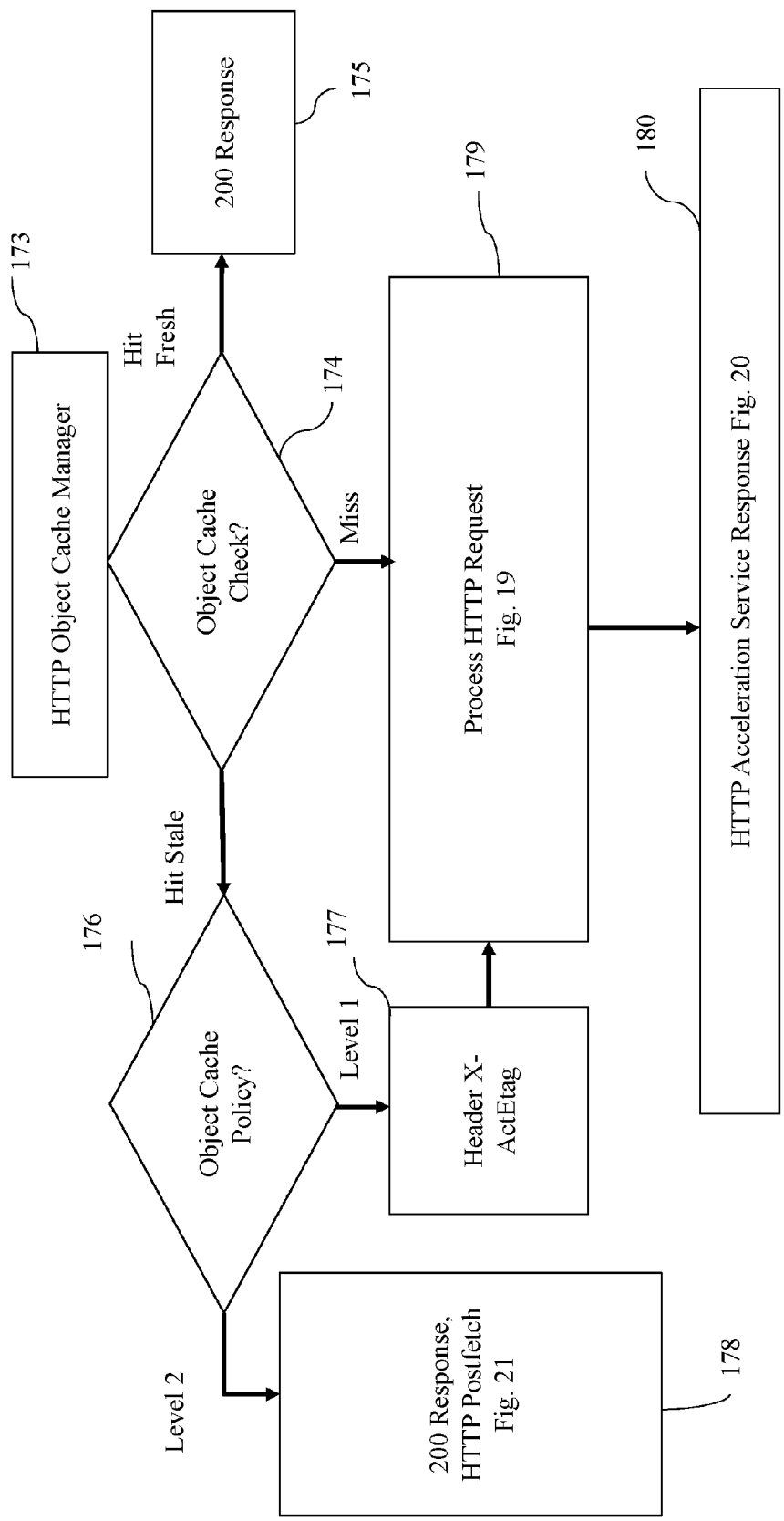
FIG. 14 illustrates one embodiment of a flow chart for processing HTTP requests by the HTTP Object Cache Manager of FIG. 3.
Figure 21:
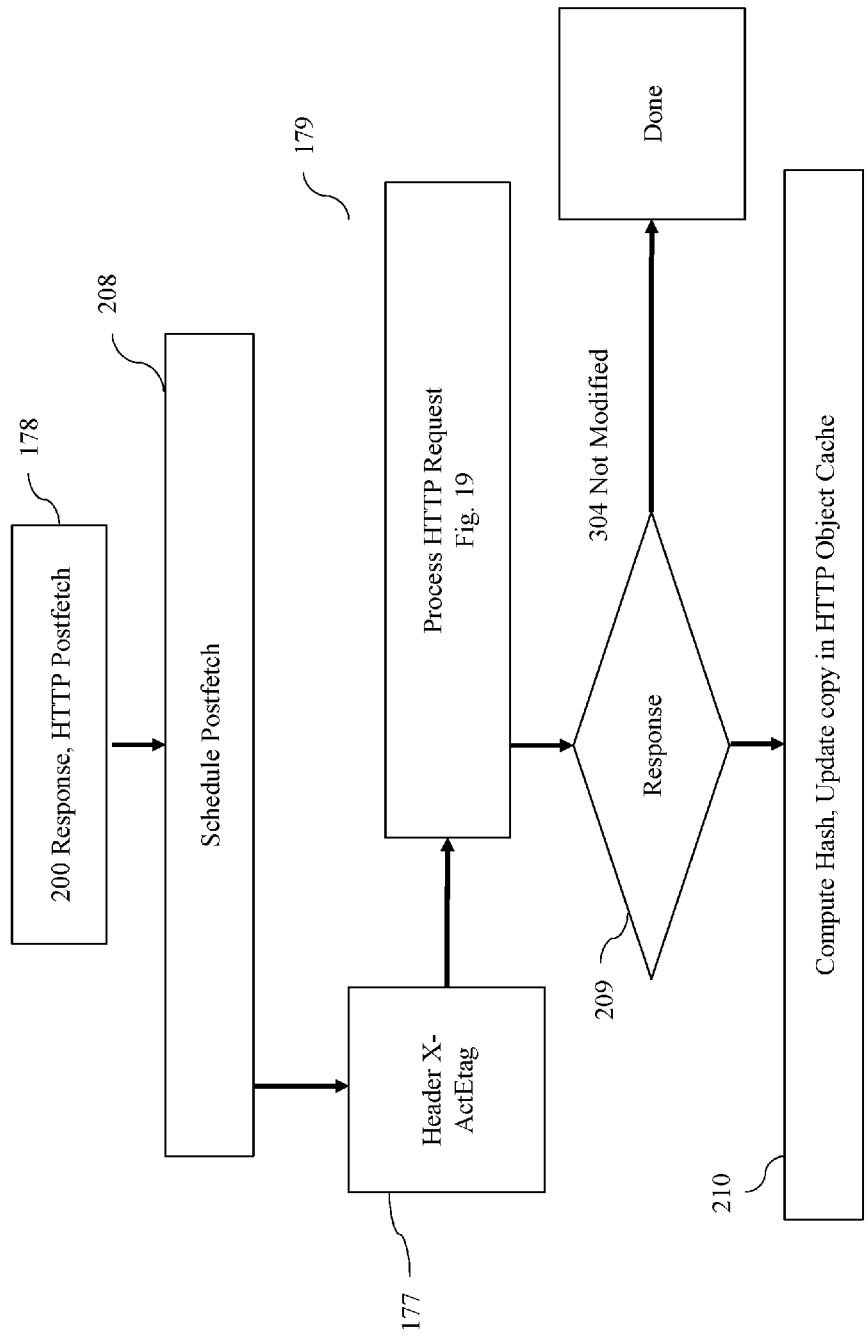
FIG. 21 illustrates one embodiment of a flow chart for post fetching the HTTP Request of FIG. 3.

FIG. 14 is a flow chart diagram depicting an embodiment of the processing of an HTTP Request at HTTP Object Cache Manager 173 running at Client Stage A1 107. The HTTP Object Cache Manager 173 maintains a HTTP Object Cache. The HTTP request URL is first reconstructed as a fully qualified HTTP URL, including protocol, host, port, URI (Uniform Resource Indicator). A hash is computed from the fully qualified URL, which is used to find the HTTP object in the HTTP Object Cache, in step 174. The check in step 174 can return one of three values—"Hit Fresh", "Miss" or "Hit Stale". If the response to step 174 is "Hit Fresh", in other words, the HTTP object is found and it is still valid based on the HTTP headers as described in RFC 2616, the HTTP object is returned to the Application 101 as the response in step 175. If the response in step 174 is a "Hit Stale", in other words, the HTTP object is found in the cache, but it is expired or not cacheable according to RFC 2616, then the Object Cache Policy is checked in step 176 to decide the next step. In step 176, if the object cache policy is "Level 2 Postfetch", the expired HTTP object is returned to the Application 101 as a response, and a HTTP postfetch request 178 is initiated to update the HTTP object in the HTTP object cache as depicted in FIG. 21. The postfetch capability provides a fast user experience when the initial stale response is acceptable, for example, when loading a shopping site, it is acceptable to load an expired page for the first time and show it to the user, while the HTTP postfetch 178 method fetches the fresh content and refreshes the HTTP object cache in the background. If in step 176, the object cache policy is "Level 1", the next step is step 177.

Figure 19:
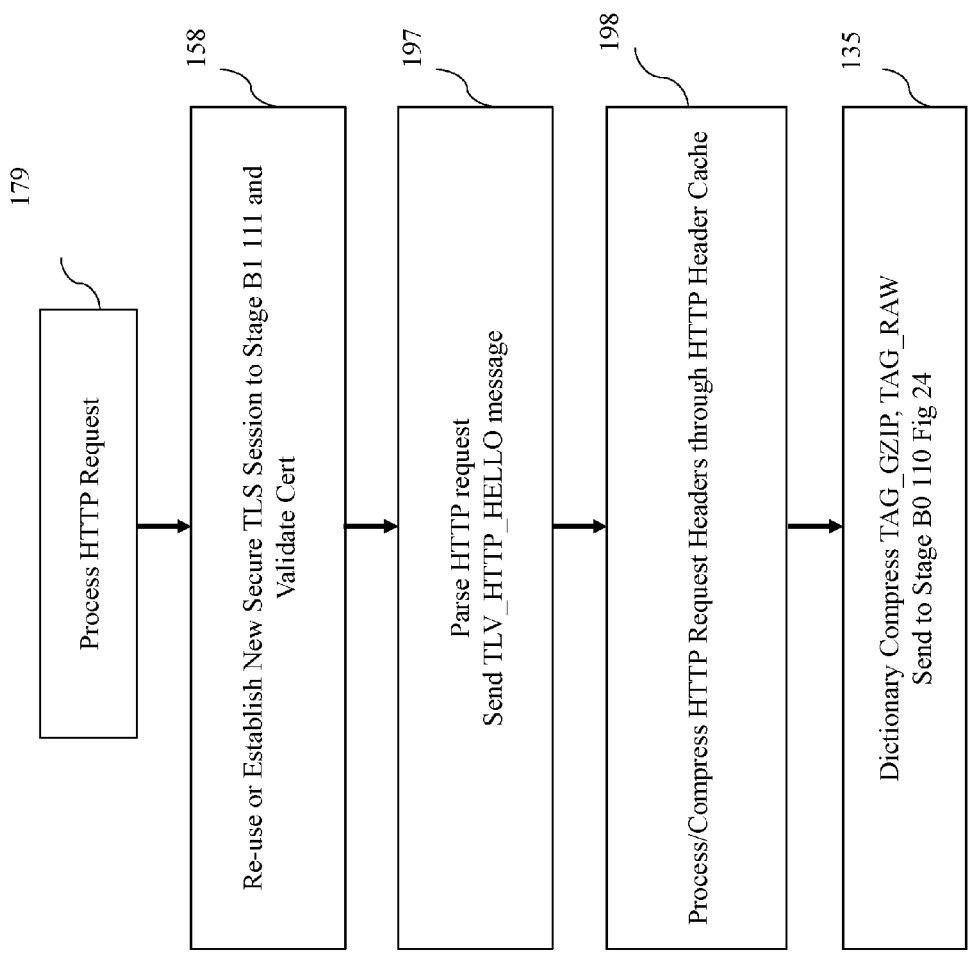
FIG. 19 illustrates one embodiment of a flow chart for processing an HTTP Request of FIG. 3.
Figure 20:
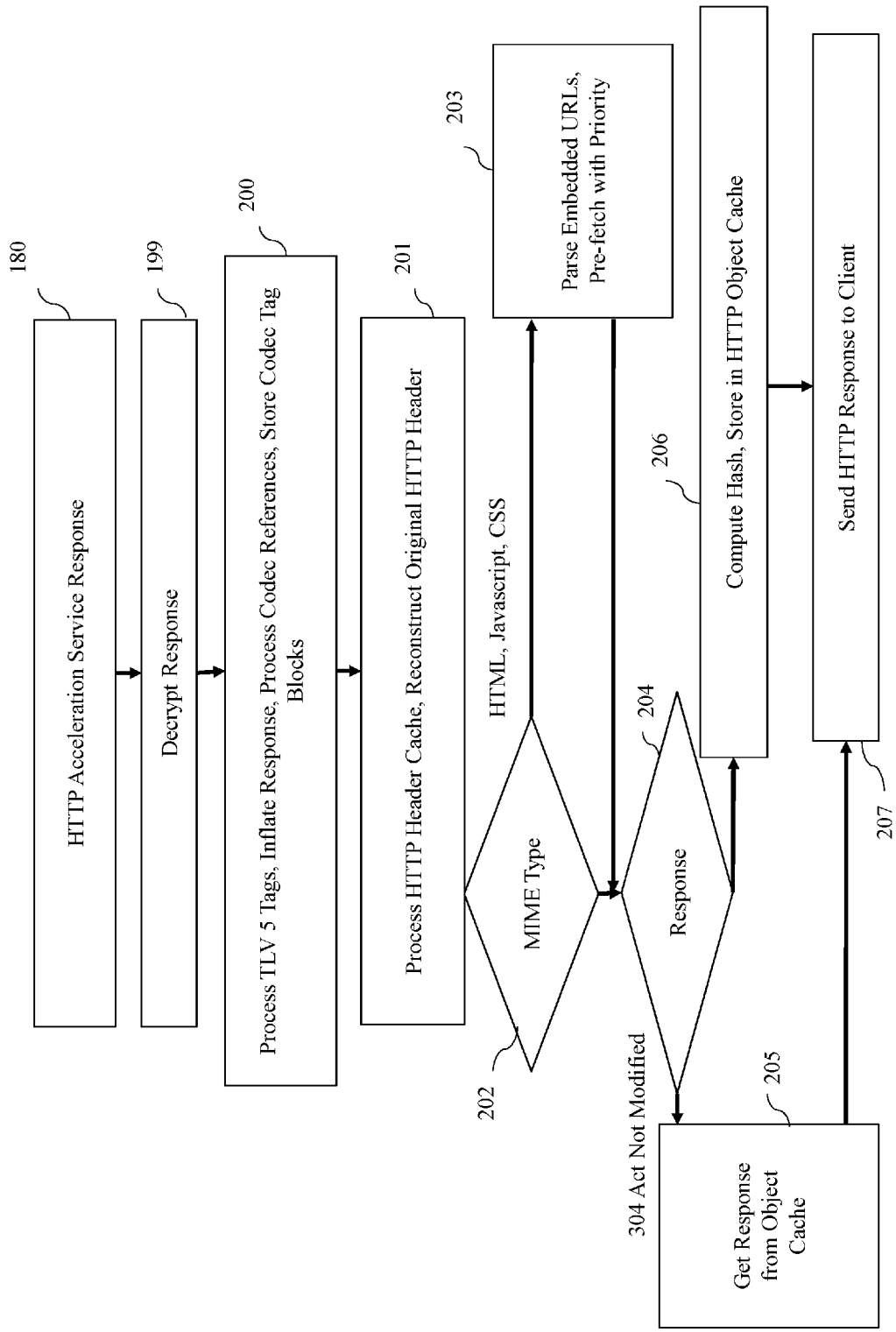
FIG. 20 illustrates one embodiment of a flow chart for processing an HTTP Response of FIG. 3.

In step 177, HTTP Object Cache Manager 173 handles the HTTP Object Cache Policy Level 1. A hash is generated from the body of the expired HTTP object in cache. That hash is added to the HTTP headers of the original request as a "X-ActEtag: hash" HTTP header. Then the HTTP request is processed in step 179 in as shown in FIG. 19, and in step 20 the HTTP Response is processed as shown in FIG. 20.

FIG. 15 is a flow chart diagram depicting an embodiment of the acceleration of IMAP traffic at IMAP Accelerator 152 running at Client Stage A1 107. The IMAP Accelerator 152 employs a cache of IMAP commands and responses. When an IMAP command is received from the Application 101, the IMAP Accelerator 152, in step 181, checks if there is a cached prior response in the cache of IMAP commands and responses. If found, then in step 182, the IMAP Accelerator 152 replies immediately with the cached prior response. In step 182, the IMAP command is forwarded to Server Stage B1 111 via the TCP Accelerator 157 as shown in FIG. 11. Upon receiving the response for the IMAP Command from the TCP Accelerator 157, in step 183, the cache of IMAP commands and responses is updated and then in step 184, the response is sent to the Application 101.

FIG. 16 is a flow chart diagram depicting an embodiment of the acceleration of POP traffic at POP Accelerator 154 running at Client Stage A1 107. The POP Accelerator 154 employs a cache of POP commands and responses. When a POP command is received from the Application 101, the POP Accelerator 154, in step 185, checks if there is a cached prior response in the cache of POP commands and responses. If found, then in step 186, the POP Accelerator 154 replies immediately with the cached prior response. In step 186, the POP command is forwarded to Server Stage B1 111 via the TCP Accelerator 157 as shown in FIG. 11. Upon receiving the response for the POP Command from the TCP Accelerator 157, in step 187, the cache of POP commands and responses is updated and then in step 188, the response is sent to the Application 101.

FIG. 17 is a flow chart diagram depicting an embodiment for accelerating SMTP traffic using the SMTP Accelerator 156 running at Client Stage A1 107. The SMTP Accelerator 156 employs a cache of SMTP commands and responses. When a SMTP command is received from the Application 101, the SMTP Accelerator 156, in step 189, checks if there is a cached prior response in the cache of SMTP commands and responses. If found, then in step 190, the SMTP Accelerator 156 replies immediately with the cached prior response. In step 190, the SMTP command is forwarded to Server Stage B1 111 via the TCP Accelerator 157 as shown in FIG. 11. Upon receiving the response for the SMTP Command from the TCP Accelerator 157, in step 191, the cache of SMTP commands and responses is updated and then in step 192, the response is sent to the Application 101.

Figure 18:
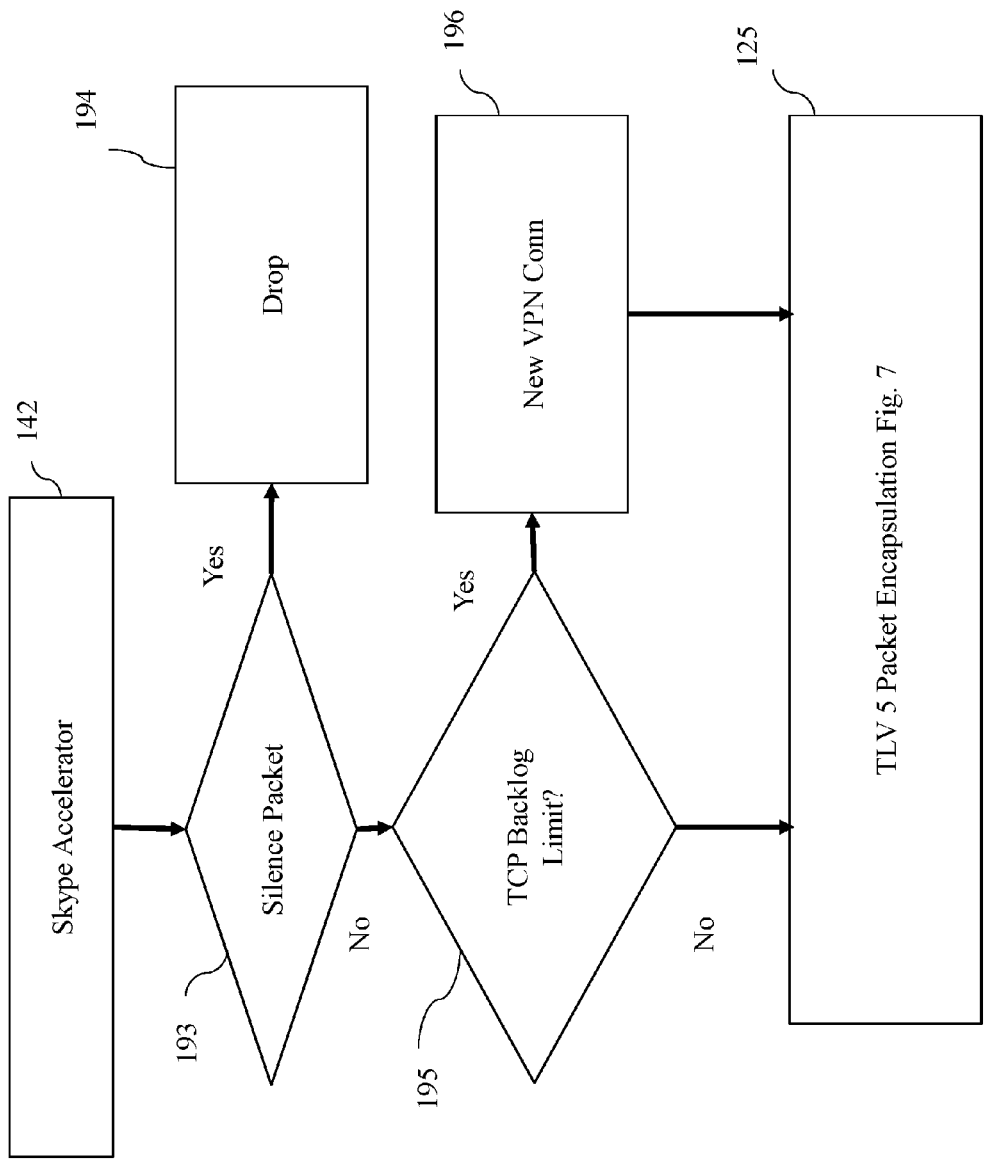
FIG. 18 illustrates one embodiment of a flow chart for accelerating Skype traffic using the Skype Accelerator of FIG. 3.

FIG. 18 is a flow chart diagram depicting an embodiment of the acceleration of Skype traffic at Skype Accelerator 142 running at Client Stage A1 107. Skype is an IP telephony protocol that uses UDP for audio and video data. In steps 193 and 194, the Skype Accelerator 142 and can intentionally drop Skype audio silence packets to save data and improve Skype performance. The Skype Accelerator will also start a new VPN connection when the TCP backlog in the VPN Connection grows, to keep the UDP traffic flowing for real-time audio/video.

Turning to FIG. 19, once an HTTP request is received in Client Stage A1 107, an existing TLS connection to Server Stage B1 111 is re-used or a new one is established and the Server Stage B1 111 certificate is confirmed for validity and identity, in step 158. Step 158 has been described in detail earlier. Then, in step 197, a TAG_HTTP_HELLO message is sent to Server Stage B1 111 so that a HTTP session is established with the HTTP Service 230 at Server Stage B1 111. The TAG_HTTP_HELLO includes the device information, user name, HTTP user-agent and other information. Step 198 maintains an "HTTP Request Header Cache". The HTTP Request Headers are compared with the entries in the HTTP Request Header Cache and if there is a match, the matching HTTP Request Headers are replaced with corresponding HTTP Request Header Cache reference tags, thus reducing the data transmitted. If there is not a match for an HTTP Request Header in the HTTP Request Header Cache, that HTTP Request header is tagged and put into the HTTP Request Header Cache. Then in step 135, the HTTP Accelerator 150 sends the data to the Server Stage B0 110 running on the Accelerator 105. Step 135 has been described in detail earlier.

FIG. 20 is a flow chart illustrating an embodiment of the processing at Client Stage A1 107 of a response from the HTTP Service 230 running on Server Stage B1 111. In step 199, Client Stage A1 107 first decrypts the response.

In step 200, Client Stage A1 107 processes the TLV5 messages. All data transmitted between Client Stage A0 109 and Server Stage B0 110 is in compressed form, so step 200 first inflates the compressed data. TAG_GZIP message indicates that the data in the message is compressed. TAG_GZIP_EMBEDDED message indicates that data in the message is compressed and the data includes other TLV5 messages. TAG_GZIP and TAG_GZIP_EMBEDDED messages are inflated through the corresponding decompression algorithm (for example, if Server Stage B0 110 uses the DEFLATE algorithm, the INFLATE algorithm is used to decompress) and replaced in the data stream. In step 200, Client Stage A0 109 maintains a byte cache called "Codec Vault" which is used by the Server Stage B0 110 to store repeated byte patterns transmitted to Client Stage A0 109. Client Stage A0 109 allocates storage for the "Codec Vault", but the Codec Vault is managed and maintained by Server Stage B0 110. Server Stage B0 100 sends TAG_BLOCK messages to store blocks of bytes into the Codec Vault and TAG_BLOCK_REF messages to reference the blocks in the Codec Vault. When there are repeated patterns in the data stream from Server Stage B0 110 to Client Stage A0 109, sending small TAG_BLOC_REF messages instead of sending the actual block bytes reduces the amount of data transmitted considerably. In step 200, Client Stage A0 109 processes the TAG_BLOCK messages and stores the blocks in the Codec Vault.

When step 200 processes the TAG_BLOCK_REF messages, the blocks are retrieved from the Codec Vault and placed in the original data stream. Thus the data coming out of step 200 is the same as the data that was sent to Server Stage B0 110 on the Accelerator 105.

In step 201, Client Stage A1 107 parses the resulting data from step 200 for HTTP response, which includes HTTP response headers and HTTP response data. The HTTP Response Headers are processed through the HTTP Response Header cache to rebuild the full size original HTTP response headers from its reduced form. In step 202, Client Stage A1 107 performs a check on the MIME (Multipurpose Internet Mail Extensions) type of the HTTP response. If the HTTP response includes a MIME type of HTML, CSS or Javascript, then the body of that response is parsed to find embedded URLs that will be referenced by that HTTP Session. The embedded URLs are pre-fetched to pre-populate the HTTP Object Cache in step 203 by the Client Stage A1 107. Those pre-fetches happen in priority order to assist the Application 101 to do progressive rendering, where HTML and CSS objects are highest priority, image objects are secondary, and Javascript and every else are lowest priority. Next in step 204, the HTTP Response code is checked by Client Stage A1 107. An HTTP response code of '304 Act Not Modified' means that the HTTP Response in the HTTP Object Cache is fresh, so the HTTP Response is fetched from the HTTP Object Cache. If the HTTP response code is 200, the HTTP Response is then stored in the HTTP Object Cache based on HTTP Response, along with a computed checksum "hash" as an 'X-ActEtag: hash" header field. All other HTTP responses are stored in the HTTP Object Cache, only if an existing 200 response does not exist. This allows the Application 101 to get offline service when the Mobile Client 100 is not connected to the Internet. In step 207, the fully decrypted, decoded and inflated HTTP response is then sent to the Application 101 by Client Stage A1 107.

FIG. 21 illustrates an embodiment of postfetching of an HTTP Request at Client Stage A1 107. The HTTP Object Cache at Client Stage A1 107 can be used in Postfetch mode, where all HTTP Responses are immediately returned from the object cache with a 200 OK response in Step 178. Then in step 208, Client Stage A1 107 schedules an HTTP Postfetch request to be sent to Client Stage B1 111. In step 177, Client Stage A1 107 handles the HTTP Object Cache Policy Level 1, as described earlier. Then in step 179, the HTTP Request is processed. Step 179 is described earlier. On receiving the HTTP Response from Server Stage B1 111, the HTTP Response code of the HTTP Response is checked if it is '304 Not Modified', in step 209. If the HTTP Response code is '304 Not Modified', it means the HTTP Response in the HTTP Object Cache is fresh and no further action is needed. If in step 209, the HTTP Response code is not '304 Not Modified', then the HTTP Object Cache is updated in step 210 and the Application 101 will get the updated object on the next request.

Figure 22:
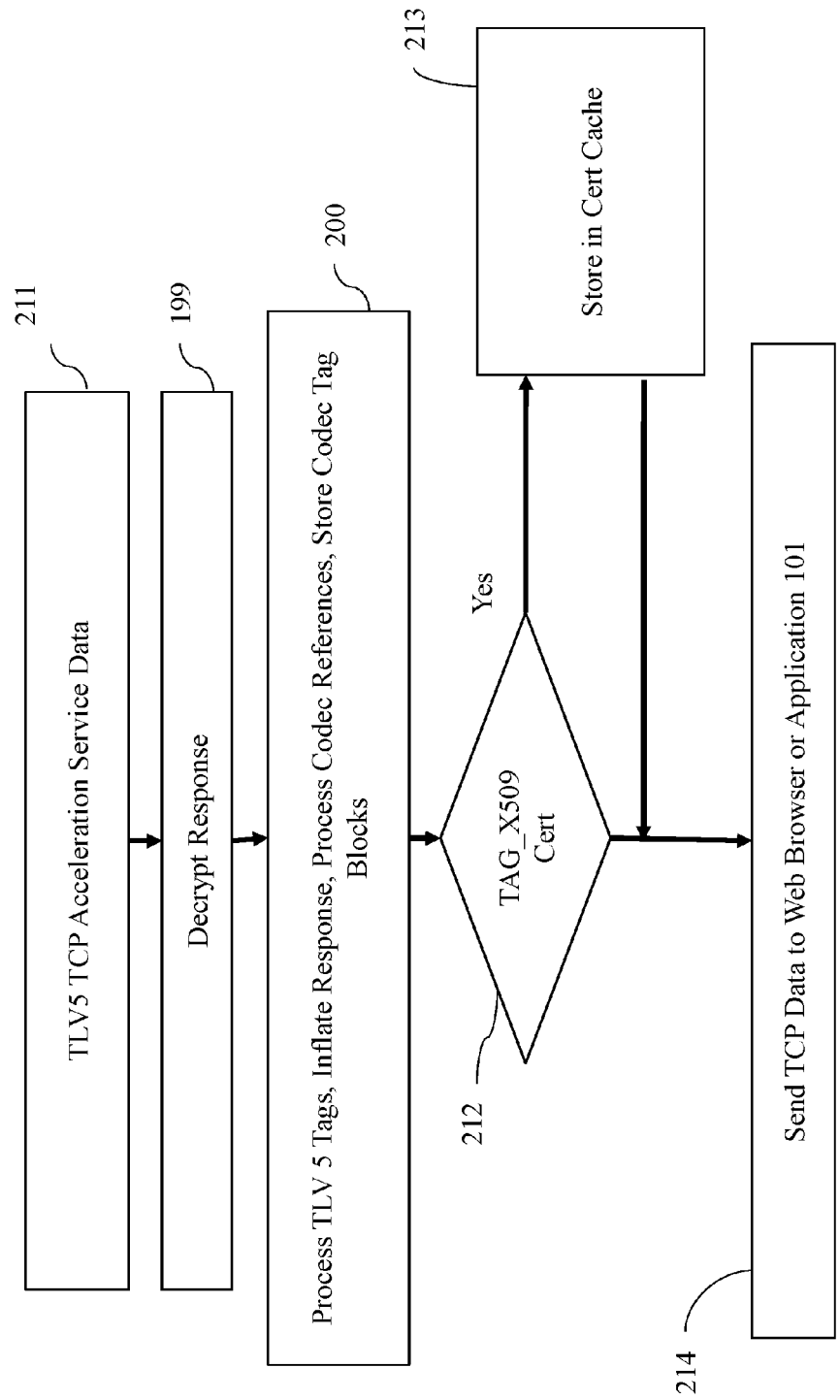
FIG. 22 illustrates one embodiment of a flow chart for processing TLV5 TCP Data of FIG. 3.

FIG. 22 is a flow chart illustrating an embodiment of the processing at Client Stage A1 107 of a TCP response from the TCP Acceleration Service 228 running on Server Stage B1 111. In step 199, Client Stage A1 107 first decrypts the TCP response. Then in step 200, the TLV5 messages are processed. Steps 199 and 200 are described earlier. If this TCP session is from the SSL Accelerator 127, then the TCP response will contain the original certificate of IP Services 103 in the form of a TAG_X509. If a TAG_X509 is found in step 212, the original certificate of the IP Services 103 is extracted and stored in the Certificate Cache of the SSL Accelerator 127, in step 213. In step 214, the original certificate and rest of the TCP data is then sent to the Application 101 by Client Stage A1 107.

Figure 23:
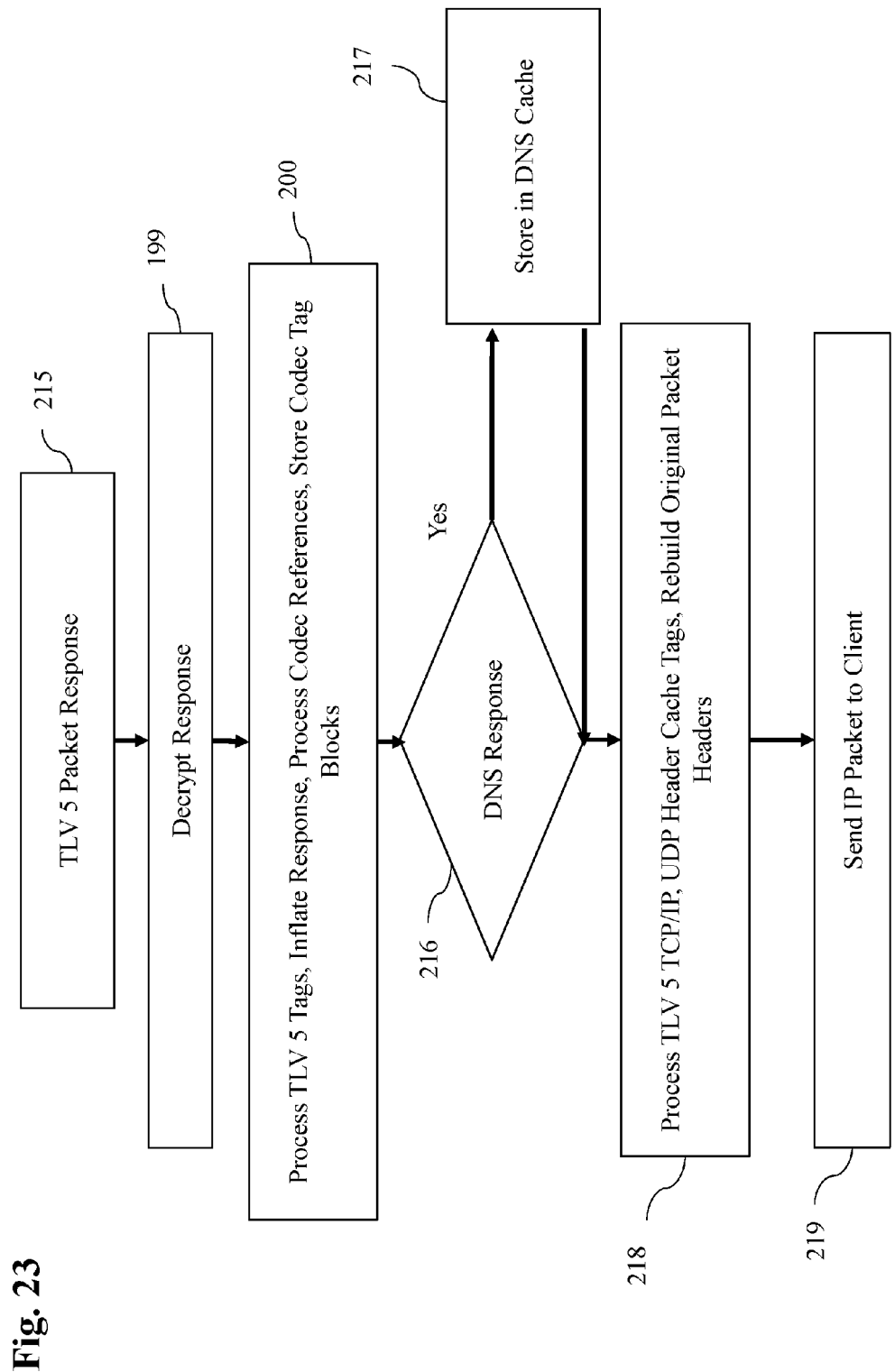
FIG. 23 illustrates one embodiment of a flow chart for processing a TLV5 Packet Response of FIG. 3.

FIG. 23 is a flow chart illustrating an embodiment of the processing at Client Stage A1 107 of the TLV5 Packet Response from the VPN Service 226 running on Server Stage B1 111. When TLV5 packet response is received by the Client Stage A1 107 in step 215, the TLV5 packet response is decrypted in step 199, then the TLV 5 tags are processed in step 200. Steps 199 and 200 are described earlier. The VPN Packet Response is an encapsulation of an IP packet. In step 216, the IP Packet is checked to see if it is a DNS response. If yes, the DNS Cache at Client Stage A1 107 is updated with the DNS response. If the IP Packet has been reduced in size by Server Stage B1 111 using IP Header Reduction, the IP Headers are reconstructed using the IP and UDP header caches at Client Stage A1 107, in step 218. Then in step 219, the reconstructed IP packet is then sent to the Application 101 by Client Stage A1 107.

Figure 24:
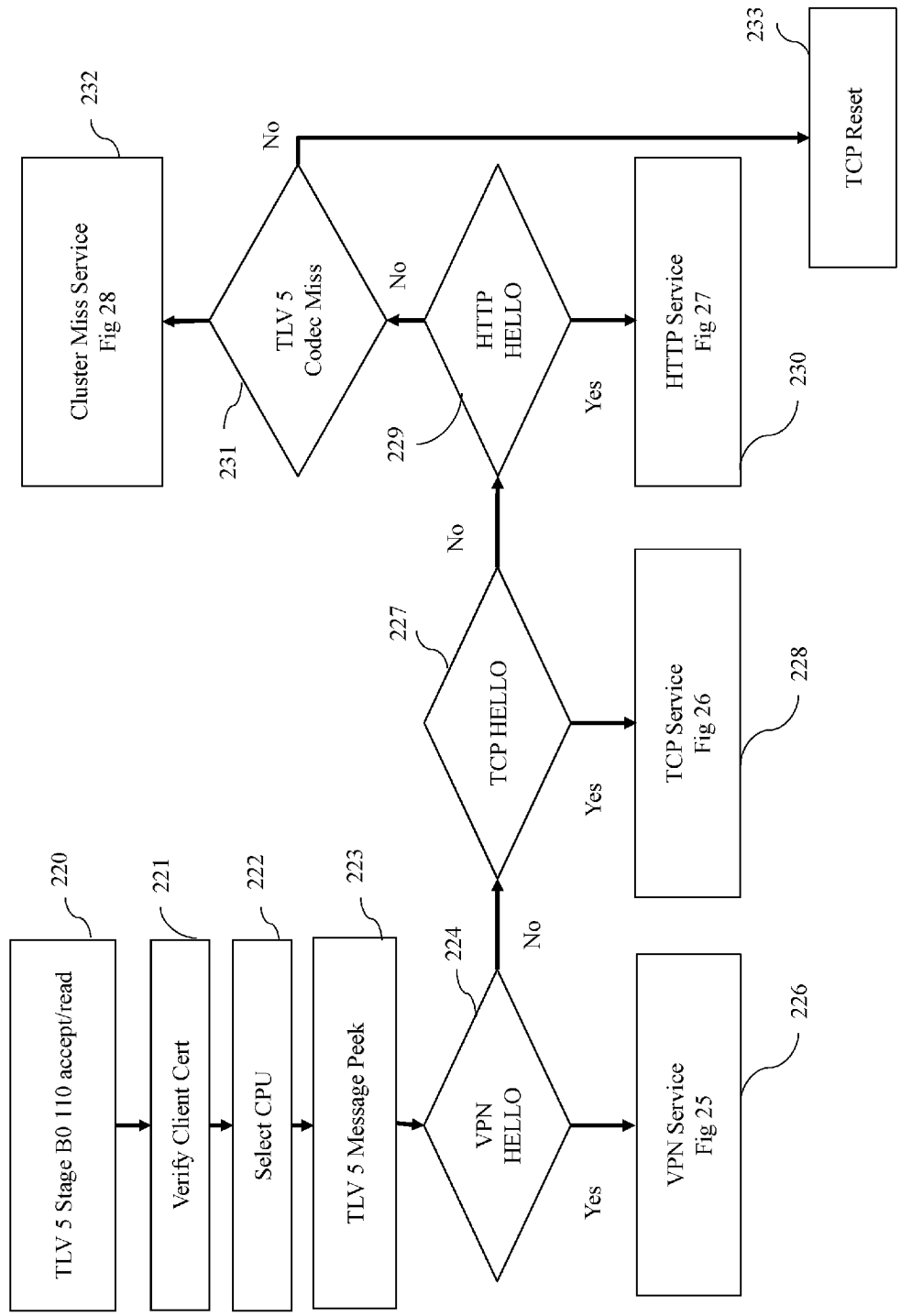
FIG. 24 illustrates one embodiment of a flow chart for processing a TLV5 Message Accept and Read of FIG. 3.

FIG. 24 is a flow chart illustrating an embodiment of processing TLV5 Message from Client Stage A0 109 at Server Stage B0 110 on Accelerator 105. Upon receiving a TLV5 Message from Client Stage A0 109 in step 220, Server Stage B0 110 verified the certificate of Client Stage A0 109 in step 221 to ensure it is authorized to connect. Then, in step 222, Server Stage B0 110 assigns a CPU (Central Process Unit) to process this request to load balance the requests across multiple CPUs on the machine. Server Stage B0 110 then peeks into the TLV5 message to identify the kind of service requested. Peeking a message means that the message is inspected, but not removed from the traffic flow. In step 224, if the message is of type VPN_HELLO, the TLV5 Message and further TLV5 messages on this connection are handed it over to the VPN Service 226 described in FIG. 25. In step 227, if the message is of type TCP_HELLO, the TLV5 Message and further TLV5 messages on this connection are handed over to the TCP Service 228 described in FIG. 26. In step 229, if the message is of type HTTP_HELLO, the TLV5 Message and further TLV5 messages on this connection are handed over to the HTTP Service 230 described in FIG. 27. In step 231, if the message is of type CODEC_MISS, the TLV5 message is handed over to the Cluster Miss Service 232 described in FIG. 28. If the message is not of any recognized type or ill formed, Server Stage B0 110 terminates the connection in step 233.

Figure 25:
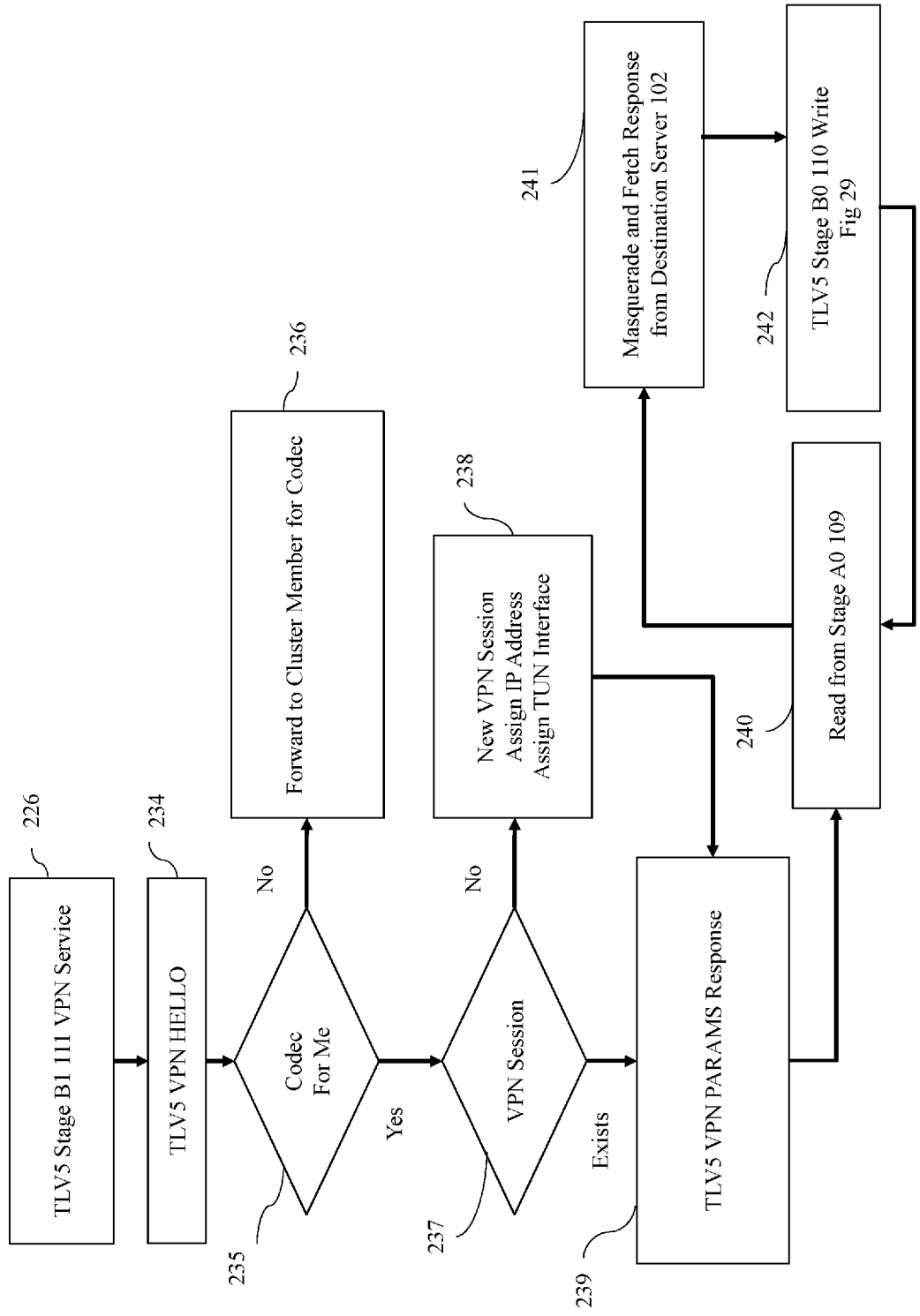
FIG. 25 illustrates one embodiment of a flow chart for processing of TLV5 messages using the VPN Service of FIG. 3.

FIG. 25 is a flow chart illustrating an embodiment of the VPN Service 226 running at Server Stage B1 111 on the Accelerator 10. On receiving the TLV5 VPN_HELLO message in step 234, which marks the initiation of a VPN connection from Client Stage A1 107, the VPN Service 226 extracts the unique identifier of Client Stage A0 109, called the "Codec Id", from the TLV5 VPN_HELLO message. VPN Service 226 can be run in a clustered machine environment. Based on the Codec Id, in step 235, the VPN Service 226 decides whether the VPN connection is to be served by this machine or the VPN connection is to be forwarded to another machine in the cluster. If result of step 235 is that the VPN Connection is to be serviced by another machine, the VPN Service 226 forwards the TLV5 VPN_HELLO message to the other machine in step 236. In step 235, if the VPN Connection is to be handled by the same machine, a check is made in step 237 to see if a VPN session already exists for the Codec Id. If an existing VPN session is not found for this Codec Id, the VPN Service 226 creates a new VPN session, assigns a unique IP address for this Codec Id, and creates a server TUN interface (a TUN interface is a virtual TCP/IP network interface) to be used for forwarding packets for this Codec Id. In step 239, the IP address for this Codec Id and other VPN parameters are sent back to Client Stage A1 107, using a VPN_PARAMS message. On receiving the VPN_PARAMS, Client Stage A1 107 creates a Virtual TCP/IP Interface 106 on its side and sets up local routes so that all packets on the Mobile Client 100 are routed to Client Stage A1 107. Then the TLV5 messages from Client Stage A0 109 are read by the VPN Service 226 in step 240.

As mentioned earlier, all data transmitted between Client Stage A0 109 and Server Stage B0 110 is in compressed form, so in step 240, Server Stage B0 110 first decrypts the message, and then inflates the compressed data. TAG_GZIP messages are inflated through the corresponding decompression algorithm (for example, if Client Stage A0 109 uses the DEFLATE algorithm, the INFLATE algorithm is used to decompress) and replaced in the data stream. If IP Header reduction is done by Client Stage A0 109, in step 240, Server Stage B0 110 also reconstructs the IP Header from its reduced form by consulting and updating the IP Header Cache at Server Stage B0 110.

Turing back to FIG. 25, the output of step 240, in the case of VPN Service 226, is IP Packets arriving from Client Stage A1 107 through TLV5 Packet Encapsulation 125. In step 241, the VPN Service 226 passes these IP Packets on to the server TUN interface, which are then sent to the Destination Server 102 using network address translation techniques such as iptables masquerading. In step 241, Response Packets from the Destination Server 102 arrive at the server TUN interface, and the VPN Service 226 sends these Response Packets to the Client Stage A1 107 using the TLV5 Server Stage B0 110 Write 242 described in FIG. 29. After step 242, the VPN Service 226 goes to back to step 240 to read the next TLV5 message.

Figure 26:
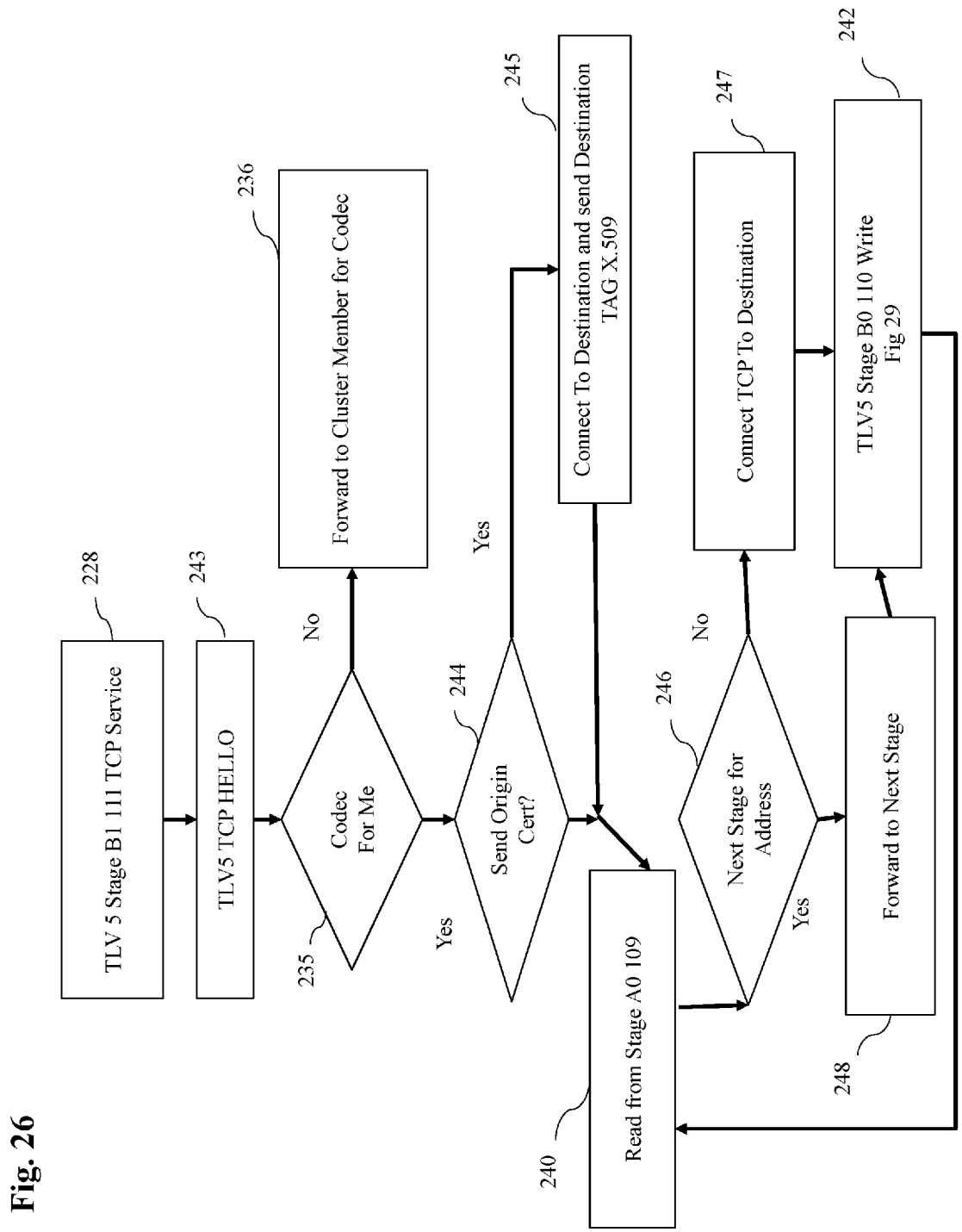
FIG. 26 illustrates one embodiment of a flow chart for processing TLV5 messages using the TCP Service of FIG. 3.

FIG. 26 is a flow chart illustrating an embodiment of the TCP Service 228 running on Server Stage B1 111 on the Accelerator 105. On receiving the TLV5 TCP_HELLO message in step 243, which marks the initiation of a TCP connection from Client Stage A1 107, the TCP Service 228 extracts the Codec Id of Client Stage A0 109 from the TLV5 TCP_HELLO message. TCP Service 228 can be run in a clustered machine environment. Based on the Codec Id, in step 235, the TCP Service 228 decides whether the TCP connection is to be served by this machine or the TCP connection is to be forwarded to another machine in the cluster. If result of step 235 is that the TCP Connection is to be serviced by another machine, the TCP Service 228 forwards the TLV5 TCP_HELLO message to the other machine in step 236. If the request is to be handled by the same machine, then in step 244, the TPC Service 228 checks if Client Stage A1 107 has requested the original cert of the destination. If yes, the TCP Service 228 establishes a secure connection to the IP Services 103, fetches the original certificate of IP Services 103, and sends the original certificate as a TAG_X509 message to Client Stage A1 107. Then in step 240, the TCP Service 228 starts reading the TCP data from Client Stage A0 109. In step 246, the TCP Service 228 checks if any of the Server Stages B2, B3, . . . BM 112 is configured as a next stage to process this TCP Connection. If yes, the TCP data is forwarded to the next stage for further processing. There can be multiple next stages chained together to provide different kinds of services (for example, data leak prevention, malware scanning, audit logging etc.). If no next stage is found in step 246, the TCP Service 228 fetches the data from IP Services 103 and passes it to Client Stage A1 107 using the TLV5 Server Stage B0 110 Write 242 described in FIG. 29. After step 242, the TCP Service 228 goes to back to step 240 to read the next TLV5 message. The responses from the chained 'next' stages in step 248 is also passed to Client Stage A1 107 using the TLV5 Server Stage B0 110 Write 242 described in FIG. 29.

Figure 27:
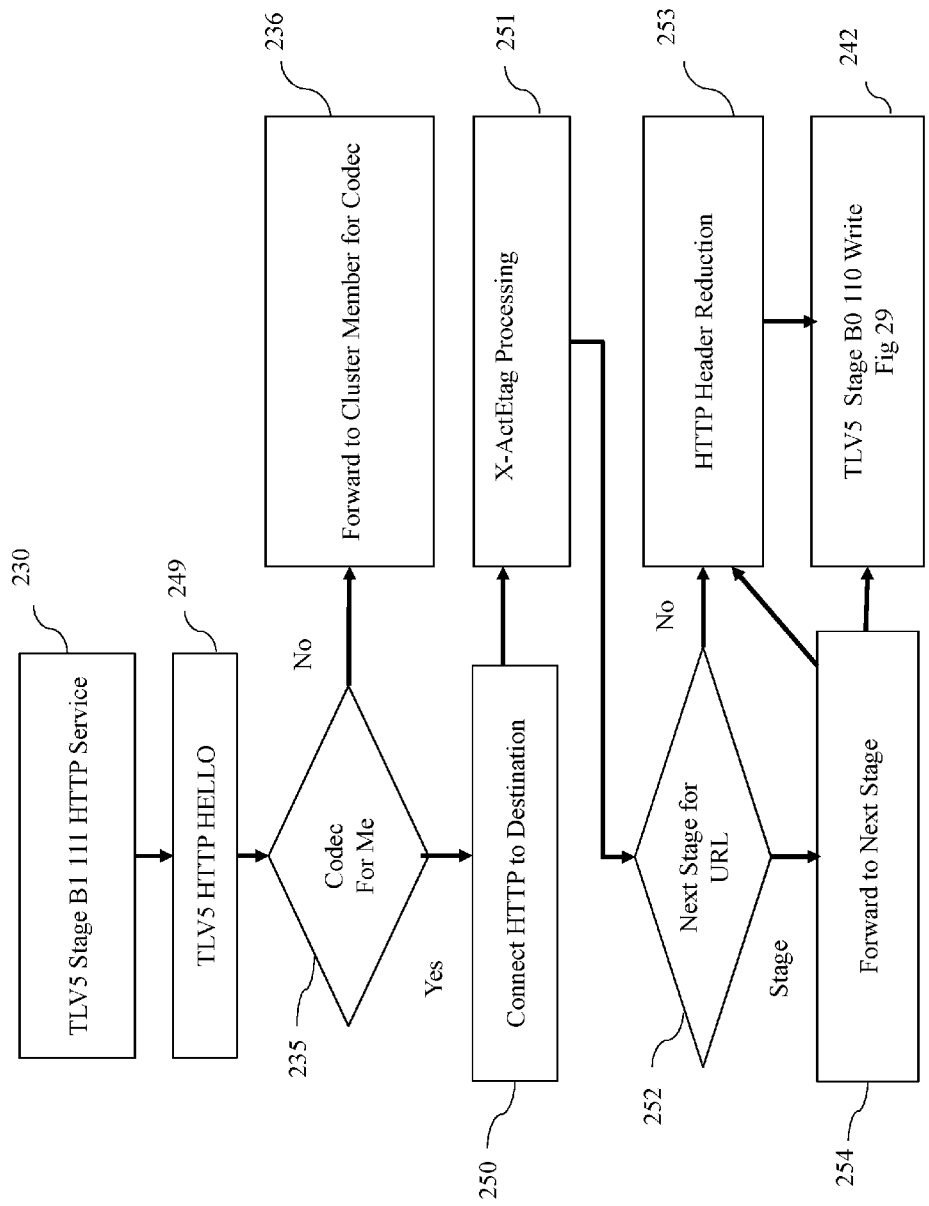
FIG. 27 illustrates one embodiment of a flow chart for processing TLV5 messages using the HTTP Service of FIG. 3.

FIG. 27 is a flow chart illustrating an embodiment of the HTTP Service 230 running on Server Stage B1 111 on the Accelerator 105. On receiving the TLV5 HTTP_HELLO message in step 249, the HTTP Service 230 extracts the Codec Id of Client Stage A0 109 from the TLV5 HTTP_HELLO message. HTTP Service 230 can be run in a clustered machine environment. Based on the Codec Id, in step 235, the HTTP Service 228 decides whether the HTTP connection is to be served by this machine or the HTTP connection is to be forwarded to another machine in the cluster. If result of step 235 is that the HTTP Connection is to be serviced by another machine, the HTTP Service 230 forwards the TLV5 HTTP_HELLO message to the other machine in step 236. If the HTTP connection is to be handled by the same machine, then in step 250, the HTTP Service 230 fetches the HTTP response from IP Services 103 and computes the "hash-value" of the HTTP response using the same mechanism as described in step 177. If the HTTP Request contains an "X-ActEtag: hash" in the HTTP Request Header, step 251 checks if the computed "hash-value" is same as "hash" from the "X-ActEtag: hash" HTTP Request header. If "hash-value" is same as "hash", then HTTP Service 230 realizes that the cached HTTP Response in the HTTP Object Cache at Client Stage A1 107 is same as the HTTP Response and hence sends a '304 Act Not Modified' HTTP Response to Client Stage A1 107. In step 252, the HTTP Service 230 checks if any of the Server Stages B2, B3, . . . BM 112 is configured as a next stage to process this HTTP Response. If yes, the HTTP Response is forwarded to the next stage for further processing. There can be multiple next stages chained together to provide different kinds of services (for example, data leak prevention, malware scanning, audit logging etc.). At the end of step 254, or if there are no next stages found in step 252, the HTTP Response is passed to HTTP Header Reduction 253. In step 253, the HTTP Service 230 maintains an "HTTP Response Header Cache". The HTTP Response Headers are compared with the entries in the HTTP Response Header Cache and if there is a match, the matching HTTP Response Headers are replaced with corresponding HTTP Response Header Cache reference tags, thus reducing the data transmitted. If there is not a match for an HTTP Response Header in the HTTP Response Header Cache, that HTTP Response header is tagged and put into the HTTP Response Header Cache. The HTTP Service 230 then passes the HTTP Response from step 253 to Client Stage A1 107 using the TLV5 Server Stage B0 110 Write 242 described in FIG. 29.

Figure 28:
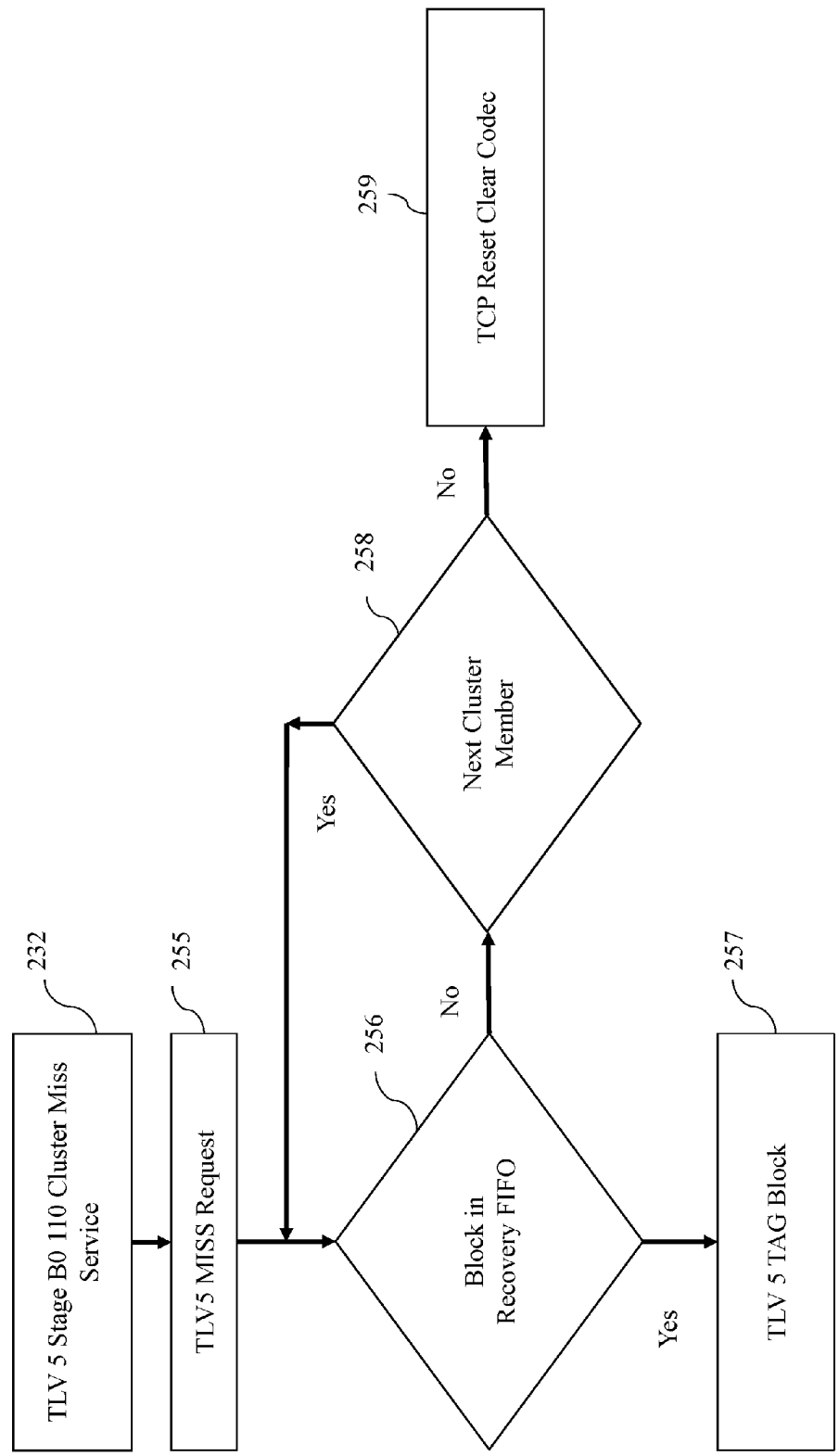
FIG. 28 illustrates one embodiment of a flow chart for processing of TLV5 messages using the Cluster Miss Service of FIG. 3.

FIG. 28 is a flow chart illustrating an embodiment of the Cluster Miss Service 232 running on Server Stage B0 110 on the Accelerator 105. As described in step 200 earlier, Server Stage B0 100 maintains a byte cache called "Codec Vault" at Client Stage A0 109. When the Client Stage A0 109 receives a TLV5 CODEC REF message from Server Stage B0 110, but does not find the corresponding block in its codec vault, Client Stage A0 109 sends a TLV5 CODEC_MISS message to Server Stage B0 110. The Cluster Miss Service 232 maintains the codec blocks sent in a recovery store. In step 255, on receiving a CODEC_MISS message, the Cluster Miss Service 232 checks the recovery store to retrieve the missing codec reference, in step 256. If the Cluster Miss Service 232 finds a matching block in its recovery store, the Cluster Miss Service 232 sends the matching block to Client Stage A0 109 using a TLV5 CODEC_BLOCK message, in step 257. If in step 256, the Cluster Miss Service 232 does not find the reference in its recovery store, the Cluster Miss Service 232 tries to retrieve the matching block from the next cluster member (which will in turn try to fetch the matching block from its next cluster member if it does not have the matching block) and send the matching block to Client Stage A10 107 using a TLV5 CODEC_BLOCK message, in step 257. If the Cluster Miss Service 232 cannot find the missing codec reference in its cluster members too, then in step 259, the Cluster Miss Service 232 clears the codec for this Client Stage A0 109 and notifies Client Stage A0 109 so Client Stage A0 109 can take corrective action and clear the Codec Vault.

Figure 29:
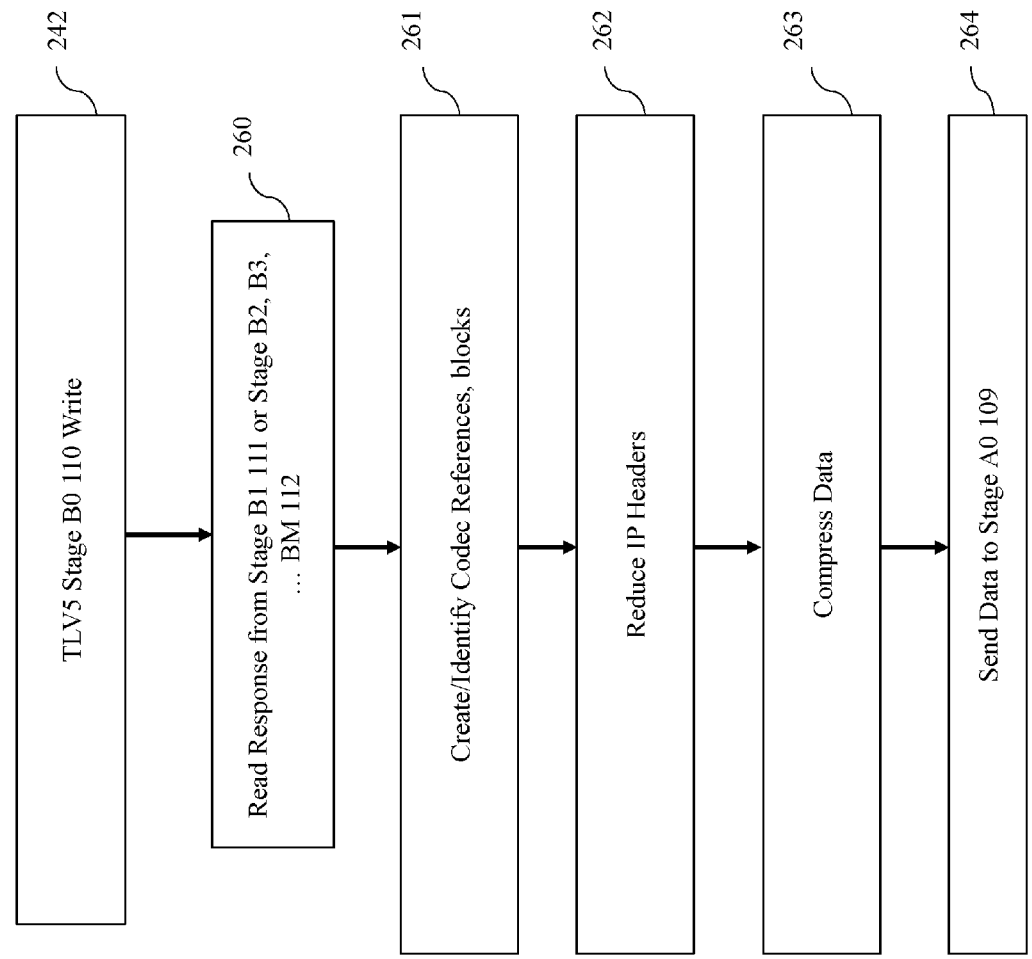
FIG. 29 illustrates one embodiment of a flow chart for sending data from Stage B0 to Stage A0 of FIG. 3.

FIG. 29 is a flow chart illustrating an embodiment of sending data from Server Stage B0 110 to Client Stage A0 109. Responses from Server Stages B1 111, B2, B3 . . . BM 112 eventually go through the TLV Server Stage B0 110 Write in step 242. In step 260, Server Stage B0 110 reads input data from Server Stage B1 111 or Server Stage B2, B3, . . . BM 112. As mentioned earlier in step 200, Client Stage A0 109 maintains a byte cache called "Codec Vault" which is used by the Server Stage B0 110 to store repeated byte patterns transmitted to Client Stage A0 109. Client Stage A0 109 allocates storage for the "Codec Vault", but the Codec Vault is managed and maintained by Server Stage B0 110. Server Stage B0 100 scans reads the input data in blocks of size B bytes. For each block BLK read, Server Stage B0 110 checks using a checksum if the block BLK is available in the Codec Vault at Client Stage A0 109. If the block BLK is available in the Codec Vault at Client Stage A0 109, Server Stage B0 110 sends a TAG_BLOCK_REF messages to reference the block in the Codec Vault at Client Stage A0 109. If the block BLK is not available in the Codec Vault at Client Stage A0 109, Server Stage B0 110 sends a TAG_BLOCK message to store the block BLK into the Codec Vault at Client Stage A0 109. When there are repeated patterns in the data stream from Server Stage B0 110 to Client Stage A0 109, sending small TAG_BLOC_REF messages instead of sending the actual block bytes reduces the amount of data transmitted considerably.

In step 262, if the input data contains an IP packet, Server Stage B0 110 reduces the size of the IP packet header using the Server Stage B0 110 IP header cache. If a match is found the IP Packet header in the Server Stage B0 110 IP header cache, the IP packet header is replaced with an IP header cache reference tag; otherwise, the IP packet header is tagged and put into the Server Stage B0 110 IP header cache.

In step 263, Server Stage B0 110 does lossless data compression to reduce the size of and time spent transmitting data, resulting in acceleration and data savings. All data received as input to step 263 is compressed using a dictionary compression algorithm such as DEFLATE, and if the resulting data is smaller than the original, the compressed data is sent to Client Stage A0 109 with TLV5 TAG_GZIP message, otherwise the original data is sent to Client Stage A0 109 with a TLV5 TAG_RAW message.

Then in step 264, Server Stage B0 110 sends the compressed data to Client Stage A0 109 over a secure TCP Connection. When Server Stage B0 110 transmits data to Client Stage A0 109, Server Stage B0 110 uses a congestion control algorithm designed to maintain throughput and fast retransmission of data resulting from intermittent packet loss that is common on wireless networks.

Figure 30:
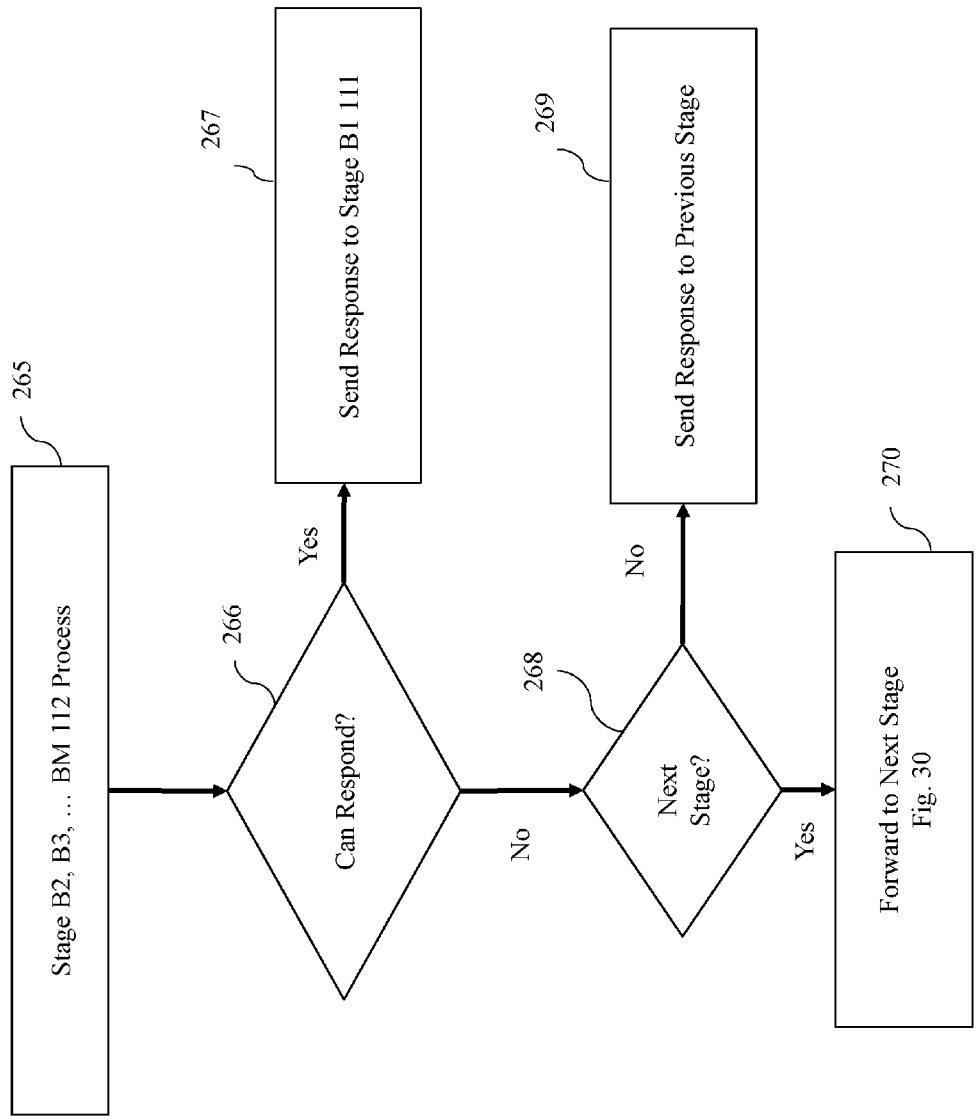
FIG. 30 illustrates one embodiment of a flow chart illustrating the process of chaining Stages B2, B3, . . . BM of FIG. 3.

FIG. 30 is a flow chart illustrating an embodiment of the Server Stages B2, B3, . . . BM 112 running on the Accelerator 105. One or more of these stages can be chained together to provide different kinds of services (for example, data leak prevention, malware scanning, audit logging, ad block etc.). In step 265, once input data arrives at one of these stages Server Stage B_i, Server Stage B_i processes the data as per the service Server Stage B_i is providing and creates output data of Server Stage B_i. At step 266, Server Stage B_i can decide to send its response directly to Server Stage B1 111 in step 267, or pass it to the next stage for further processing in step 270. On receiving a response from the next stage, Server Stage B_i sends the response to its previous stage in the chain. For example, a malware detection service can decide not to pass the response to the next stage if decides to block the content. An audit logging service might choose to log the request and pass it on to the next stage for further processing.

The described embodiments are susceptible to various modifications and alternative forms, and specific examples thereof have been shown by way of example in the drawings and are herein described in detail. It should be understood, however, that the described embodiments are not to be limited to the particular forms or methods disclosed, but to the contrary, the present disclosure is to cover all modifications, equivalents, and alternatives.

What is claimed is:

1. A method for reducing network traffic and providing secure network access between an application and a destination server, comprising:

intercepting network requests from the application via one or more client stages on a mobile device;

compressing the intercepted network requests via said one or more client stages;

encrypting network protocols and data of the compressed network requests;

forwarding the encrypted network requests from the one or more client stages to one or more server stages of an accelerator;

receiving a network response from the destination server via the one or more server stages in response to the forwarded network requests;

compressing the received network response via said one or more server stages;

encrypting network protocols and data of the compressed network response;

forwarding the encrypted network response from the one or more server stages to the one or more client stages; and transmitting the encrypted network response from the one or more client stages to the application, wherein said forwarding the encrypted network requests and said forwarding the encrypted network response comprise modifying Transmission Control Protocol parameters and congestion control of the encrypted network requests and the encrypted network response.

2. The method of claim 1, wherein said one or more client stages operate as a local proxy service to the application on the mobile device and said one or more server stages operate as an Internet based proxy service for the destination server.

3. The method of claim 1, further comprising providing at least one of a firewall, data cache, an image processor, a video processor, a virus detector, a malware detector, an audit log of web sites visited, byte accounting, and content monitor via said one or more client stages and said one or more server stages.

4. The method of claim 1, wherein said encrypting network protocols of the compressed network requests are based on the network requests.

5. The method of claim 1, further comprising masquerading an Internet Protocol address of the destination server by including a Transmission Control Protocol/Internet Protocol stack at said one or more client stages.

6. The method of claim 1, wherein said intercepting the network requests further comprise determining whether the network requests are to be at least one of intercepted, bypassed, and blocked.

7. The method of claim 1, further comprising generating a Secure Sockets Layer and Transport Layer Security certificate from an original Secure Sockets Layer and Transport Layer Security certificate of the destination server via said one or more server stages.

8. A system for reducing network traffic and providing secure network access between an application and a destination server, comprising:

one or more client stages on a mobile device;

an accelerator; and one or more server stages hosted on the accelerator and in communication over a network with said one or more client stages, wherein said one or more client stages intercept network requests from the application running on the mobile device, compress the intercepted network requests, encrypt network protocols and data of the compressed network requests, and forward the encrypted network requests to said one or more server stages, wherein said one or more server stages receive a network response for the network requests from the destination server, compress the received network response, encrypt network protocols and data of the compressed network response, and forward the encrypted network response to said one or more client stages, and wherein said one or more client stages and said one or more server stages each comprises an Internet Protocol header cache for compressing Internet Protocol headers of the network response and the network requests.

9. The system of claim 8, wherein said one or more client stages further transmit the encrypted network response forwarded from said one or more server stages to the application.

10. The system of claim 8, wherein said one or more client stages operate as a local proxy service to the application on the mobile device and said one or more server stages operate as an Internet based proxy service for the destination server.

11. The system of claim 8, wherein said one or more client stages and said one or more server stages further provide at least one of a firewall, data cache, an image processor, a video processor, a virus detector, a malware detector, an audit log of web sites visited, byte accounting, and content monitor.

12. The system of claim 8, wherein said one or more client stages encrypt the network protocols based on the network response and the network requests.

13. The system of claim 8, wherein said one or more client stages modify Transmission Control Protocol parameters and congestion control of the encrypted network requests and said one or more server stages modify the Transmission Control Protocol parameters and congestion control of the encrypted network response.

14. The system of claim 8, further comprising a virtual Internet Protocol interface to masquerade an Internet Protocol address of the destination server by including a Transmission Control Protocol/Internet Protocol stack at said one or more client stages.

15. The system of claim 8, wherein said one or more client stages determine whether the network requests are to be at least one of intercepted, bypassed, and blocked.

16. The system of claim 8, wherein said one or more client stages further comprise a Domain Name Service cache for intercepting Domain Name Service requests from the application and a Domain Name Service response from the accelerator.

17. A system for reducing network traffic and providing secure network access between an application and a destination server, comprising:

one or more client stages on a mobile device;

an accelerator; and one or more server stages hosted on the accelerator and in communication over a network with said one or more client stages, wherein said one or more client stages intercept a network requests from the application running on the mobile device, compress the intercepted network requests, encrypt network protocols and data of the compressed network requests, and forward the encrypted network requests to said one or more server stages, wherein said one or more server stages receive a network response for the network requests from the destination server, compress the received network response, encrypt network protocols and data of the compressed network response, and forward the encrypted network response to said one or more client stages, and wherein said one or more client stages further comprise a Hypertext Transfer Protocol object cache manager to cache and postfetch Hypertext Transfer Protocol objects of the network response.

18. The system of claim 17, wherein said one or more client stages and said one or more server stages each comprises a Hypertext Transfer Protocol header cache for compressing Hypertext Transfer Protocol headers of the network response and the network requests.

\* \* \* \* \*